(12) United States Patent
Suzuki et al.

(10) Patent No.: US 8,564,183 B2
(45) Date of Patent: Oct. 22, 2013

(54) SPARK PLUG AND METHOD FOR MANUFACTURING SPARK PLUG

(75) Inventors: Akira Suzuki, Nagoya (JP); Katsuya Takaoka, Ichinomiya (JP); Toshitaka Honda, Nagoya (JP); Hirokazu Kurono, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 25 days.

(21) Appl. No.: 13/498,038

(22) PCT Filed: Sep. 13, 2010

(86) PCT No.: PCT/JP2010/005572
§ 371 (c)(1),
(2), (4) Date: Mar. 23, 2012

(87) PCT Pub. No.: WO2011/036853
PCT Pub. Date: Mar. 31, 2011

(65) Prior Publication Data
US 2012/0319556 A1      Dec. 20, 2012

(30) Foreign Application Priority Data
Sep. 25, 2009    (JP) .................................. 2009-221068

(51) Int. Cl.
*H01T 13/00*        (2006.01)

(52) U.S. Cl.
USPC .............................................. 313/118; 445/7

(58) Field of Classification Search
USPC .................. 313/118–145; 123/32, 41, 143 R, 123/146.5 R, 169 P, 260, 280, 169 R, 169 EL, 123/310; 445/7; 219/121.6, 121.64
See application file for complete search history.

(56) References Cited

U.S. PATENT DOCUMENTS

| | | |
|---|---|---|
| 2007/0298245 A1 | 12/2007 | Ogata et al. |
| 2010/0084960 A1 | 4/2010 | Kurono et al. |
| 2010/0133978 A1 | 6/2010 | Ishida et al. |
| 2010/0136867 A1 | 6/2010 | Kurono et al. |

FOREIGN PATENT DOCUMENTS

| | | |
|---|---|---|
| EP | 2 190 085 A1 | 5/2010 |
| JP | 2001-002464 A | 1/2001 |
| JP | 2001-335360 A | 12/2001 |
| JP | 2002-246146 A | 8/2002 |
| JP | 2008-024583 A | 2/2008 |
| JP | 4613242 B2 | 1/2011 |
| WO | 2009/017101 A1 | 2/2009 |
| WO | 2009/119097 A1 | 10/2009 |
| WO | 2009/119098 A1 | 10/2009 |

*Primary Examiner* — Donald Raleigh
(74) *Attorney, Agent, or Firm* — Sughrue Mion, PLLC

(57) ABSTRACT

A spark plug having a center electrode, an insulator and a metal shell and satisfying conditions (1) to (5) as defined herein. Also disclosed is a method of manufacturing a spark plug including the step of producing an insulator by preparing a raw material powder in such a manner that the particle size distribution ratio (90% volume diameter/10% volume diameter) between particles of 10% volume diameter and particles of 90% volume diameter in the raw material powder is 3.6 to 5.2, and then, press-forming and sintering the prepared raw material powder.

10 Claims, 3 Drawing Sheets

SPARK PLUG AND METHOD FOR MANUFACTURING SPARK PLUG

CROSS REFERENCE TO RELATED APPLICATIONS

This application is a National Stage of International Application No. PCT/JP2010/005572 filed Sep. 13, 2010, claiming priority based Japanese Patent Application No. 2009-221068, filed Sep. 25, 2009, the contents of all of which are incorporated herein by reference in their entirety.

TECHNICAL FIELD

The present invention relates to a spark plug and a method for manufacturing a spark plug. More particularly, the present invention relates to a spark plug having good combustible-gas ignitability even when it is downsized and a method for high-yield manufacturing of a spark plug with good combustible-gas ignitability.

BACKGROUND ART

A spark plug for an internal combustion engine, such as an automotive engine, generally includes a center electrode, a substantially cylindrical insulator disposed around the center electrode, a substantially cylindrical metal shell disposed around the insulator and a ground electrode attached as desired to a front end of the metal shell. One such type of spark plug is disclosed in Patent Document 1. Patent Document 1 specifically recites therein "a spark plug comprising: a shaft-shaped center electrode; a metal shell disposed on an outer circumferential surface of the center electrode; a ground electrode having one end coupled to the metal shell and the other end facing the center electrode; and a spark plug insulator according to any one of claims 1 to 4 arranged to provide insulation between the center electrode and the metal shell" (see claim 5).

The structure of the internal combustion engine to which the spark plug is mounted has recently been becoming more complicated. There is thus a demand to reduce the size such as diameter of the spark plug in order to secure the design flexibility of the internal combustion engine. It is effective to decrease the wall thickness of the insulator for the purpose of downsizing the spark plug. However, the spark plug cannot maintain its withstand voltage characteristics when the wall thickness of the insulator becomes decreased. On the other hand, it is effective to keep the outer diameter of the center electrode and the wall thickness of the insulator similar to those of conventional spark plugs for the purpose of downsizing the spark plug while securing the durability and withstand voltage characteristics of the spark plug. In such a case, the clearance between the insulator and the metal shell in the ignition part (sometimes referred to as "gas volume") becomes narrowed. When the clearance between the insulator and the metal shell becomes narrower than required, the spark plug fails to generate a proper spark discharge in a spark discharge gap between the center electrode and the ground electrode but causes a so-called lateral spark between an outer circumferential of the insulator and an inner circumferential surface of the metal shell. This results in a deterioration of the ignitability of the spark plug.

By the way, high-compression internal combustion engines and internal combustion engines with superchargers have recently been developed for the purpose of improvements in engine performance and efficiency. In each of these internal combustion engines, the ignition part of the spark plug is subjected to extreme conditions due to increases in the ambient temperature and discharge voltage of the spark plug. When the spark plug, particularly the downsized spark plug, is subjected to such extreme conditions, the ignitability of the spark plug could significantly deteriorate during high-load operation of the internal combustion engine. The reasons for such ignitability deterioration are assumed as follows. As the front end of the insulator is heated to a high temperature during high-load operation of the internal combustion engine, there occurs softening of a glass component in the insulator so that electrons of the glass component move actively to generate a flow of electric current in the glass phase of the insulator. The generated electrical current is fed to the outer circumferential surface of the insulator and discharged to the outside air. Namely, the electric current for the spark discharge is leaked out of the insulator. The spark plug cannot receive a required amount of energy for the spark discharge and thus cannot generate a proper spark discharge within the spark discharge gap between the center electrode and the ground electrode. Hereinafter, the electric current flowing through the glass phase of the insulator and leaked out of the insulator is referred to as "leakage current" in the present invention.

The ignitability deterioration of the spark plug directly leads to a deterioration of emission performance. It is particularly important to solve such an ignitability deterioration problem in these days where environmental measures are required.

PRIOR ART DOCUMENTS

Patent Documents

Patent Document 1: Japanese Laid-Open Patent Publication No. 2001-335360

DISCLOSURE OF THE INVENTION

Problems to be Solved by the Invention

It is therefore an object of the present invention to provide a spark plug with good combustible-gas ignitability even when it is downsized.

It is also an object of the present invention to provide a method for high-yield manufacturing of a spark plug with good combustible-gas ignitability.

Means for Solving the Problems

As a solution to the above object, there is provided according to the present invention a spark plug comprising: a center electrode extending in an axial direction of the spark plug; a substantially cylindrical insulator disposed around the center electrode and having a small-diameter leg portion at a front end side thereof; and a substantially cylindrical metal shell disposed around the insulator, wherein the spark plug satisfies the following conditions (1) to (5).

Condition (1): The insulator has a wall thickness T of 0.3 to 1.1 mm at an imaginary plane including a front end face of the metal shell.

Condition (2): A region of the insulator extending from a front end of the insulator to at least 2 mm rear from the imaginary plane is formed of an alumina-based sintered body containing a Si component, a rare earth element component and components of at least two kinds of Group 2 elements of the periodic table according to IUPAC recommendations 1990 and being substantially free from a B component.

Condition (3): The ratio $R_{RE}$ of a mass of the rare earth element component (in terms of oxide) to a total mass of the Si component, the components of the Group 2 elements and the rare earth element component (in terms of oxides) in the alumina-based sintered body is 0.15 to 0.45.

Condition (4): The ratio $R_2$ of a total mass of the components of the Group 2 elements (in terms of oxides) to a mass of the Si component (in terms of oxide) in the alumina-based sintered body is 0.25 or greater.

Condition (5): The alumina-based sintered body includes, in a grain boundary phase thereof, an aluminate crystal containing the rare earth element component.

As another solution to the above object, there is provided according to the present invention a manufacturing method of a spark plug, comprising: producing an insulator by preparing a raw material powder, press-forming the prepared raw material powder into a given body and sintering the press-formed body, wherein the raw material powder is prepared by mixing an Al compound powder, a Si compound powder, a powder of compounds of at least two kinds of Group 2 elements of the periodic table according to IUPAC recommendations 1990 and a rare earth element compound powder in such a manner as to satisfy the following condition (A).

Condition (A): The particle size distribution ratio (90% volume diameter/10% volume diameter) between particles of 10% volume diameter and particles of 90% volume diameter in the raw material powder is 3.6 to 5.2.

Effects of the Invention

The spark plug according to the present invention satisfies all of the above conditions (1) to (5) whereby, even when the spark plug is downsized, the occurrence of leakage current in the insulator can be prevented effectively. It is thus possible according to the present invention to provide the spark plug having good combustible-gas ignitability even when it is downsized.

The manufacturing method of the spark plug according to the present invention includes the step of producing the insulator by preparing the mixed raw material powder in such a manner to satisfy the above condition (A), and then, forming and sintering the prepared raw material powder, whereby the insulator in which leakage current is unlikely to occur can be produced with high repeatability due to easy formation of an aluminate crystal phase. It is thus possible according to the present invention to enable high-yield manufacturing of the spark plug with good combustible-gas ignitability.

BEST MODES FOR CARRYING OUT THE INVENTION

A spark plug according to the present invention includes a center electrode extending in an axial direction of the spark plug, a substantially cylindrical insulator disposed around the center electrode and having a small-diameter leg portion at a front end side thereof and a substantially cylindrical metal shell disposed around the insulator. As long as the spark plug has such a structure, the other structure of the spark plug is not particularly limited. There can be adopted various known configurations for the spark plug. For example, the spark plug according to the present invention may be a so-called surface-discharge type spark plug of the above-mentioned structure. The spark plug may further include, in addition to the center electrode, the insulator and the metal shell, a ground electrode having one end facing the center electrode with a spark discharge gap left therebetween.

Figure 1:
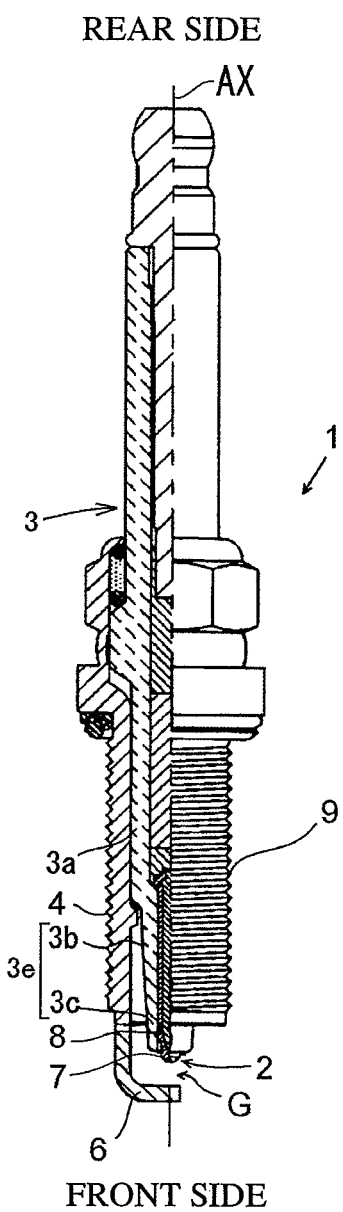
FIG. 1 is a schematic view, partially in section, of one embodiment of a spark plug according to the present invention.
Figure 2:
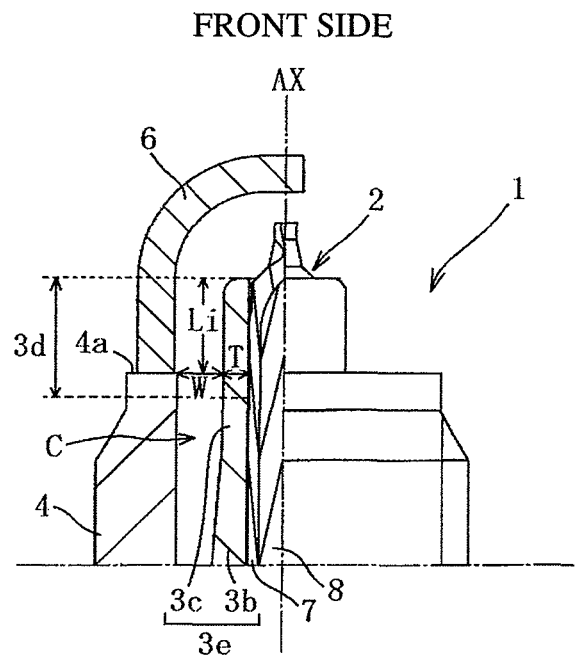
FIG. 2 is an enlarged view, partially in section, of substantial front end part of one embodiment of the spark plug according to the present invention.

FIGS. 1 and 2 show one embodiment of the spark plug according to the present invention. More specifically, FIG. 1 is a schematic view, partially in section, of a spark plug 1 as the one embodiment of the spark plug according to the present invention; and FIG. 2 is an enlarged view, partially in section, of substantial front end part of the spark plug 1 as the one embodiment of the spark plug according to the present invention. It is herein noted that, in the following description, the bottom and top sides in FIG. 1 are defined as the front and rear sides with respect to the direction of the axis AX, respectively; whereas the top and bottom sides in FIG. 2 are defined as the front and rear sides with respect to the direction of the axis AX.

As shown in FIGS. 1 and 2, the spark plug 1 includes a substantially rod-shaped center electrode 2, a substantially cylindrical insulator 3 disposed around the center electrode 2, a cylindrical metal shell 4 retaining therein the insulator 3 and a ground electrode 6 having one end facing a front end face of the center electrode 2 with a spark discharge gap G left therebetween and the other end joined to a front end face of the metal shell 4.

The metal shell 4 is cylindrical in shape so that the insulator 3 is inserted and retained in the metal shell 4. A thread portion 9 is formed on an outer circumferential surface of a front end side of the metal shell 4 so as to mount the spark plug 1 onto a cylinder head (not shown) of an internal combustion engine by means of the thread portion 9. The metal shell 4 can be formed of e.g. a conductive steel material such as low-carbon steel.

The thread portion 9 is standardized to, for example, a nominal diameter of M10, M12 or M14. In the present invention, the nominal diameter of the thread portion 9 refers to a diameter value according to ISO 2705 (M12), ISO 2704 (M10) and the like and allows for variations within dimensional tolerances defined by these standards. When the spark plug 1 is mounted to a recent complicated internal combustion engine, a high-output internal combustion engine or a downsized internal combustion engine, the nominal diameter of the thread portion 9 is generally adjusted to be M10 or smaller. There is a difficulty in securing the sufficient wall thickness of the insulator 3 as the nominal diameter of the thread portion 9 becomes decreased. In the present invention, however, it becomes unlikely that leakage current will occur in the insulator 3 by satisfaction of not only the condition (1) but also the conditions (2) to (5) as explained below even when the wall thickness of the insulator 3 is decreased for use in a downsized spark plug. The spark plug according to the present invention is thus able to attain good combustible-gas ignitability even when the nominal diameter of the thread portion 9 is decreased to be M10 or smaller. It is accordingly possible to solve the object of the present invention, that is, to impart good combustible-gas ignitability to such a downsized spark plug that the nominal diameter of the thread portion 9 is M10 or smaller.

The center electrode 2 is substantially rod-shaped along the direction of the axis and, as shown in FIGS. 1 and 2, includes an outer electrode member 7 and an inner electrode member 8 coaxially embedded in a center portion of the outer electrode member 7. The center electrode 2 is fixed in the insulator 3, with a front end portion of the center electrode 2 protruding outside from a front end face of the insulator 3, and is kept insulated from the metal shell 4. The outer electrode member 7 of the center electrode 2 can be formed of a nickel-based alloy material of high heat and corrosion resistance, whereas the inner electrode member 8 of the center electrode 2 can be formed predominantly of a metal material of high heat conductivity, such as copper (Cu) or nickel (Ni), preferably copper. It is preferable to embed the inner electrode member 8 in the outer electrode member 7 in such a manner that, when the center electrode 2 is retained in the insulator 3, the inner electrode member 8 extends to or over an imaginary plane including at least a front end face 4a of the metal shell 4 as clearly shown in FIG. 2. It is particularly preferable that inner electrode member 8 extends to a front side of the imaginary plane. When the inner electrode member 8 is embedded in the outer electrode member 7 as mentioned above, the inner electrode member 8 allows rapid radiation of heat from the insulator 3 so as to improve the heat resistance of the spark plug 1 and at the same time to, when the ambient temperature of the insulator 3 reaches a high degree, decrease the temperature of the insulator 3 itself and thereby prevent the occurrence of leakage current in the insulator 3 effectively even under higher-temperature conditions. The spark plug 1 is thus able to attain high heat resistance, prevent leakage current even under extreme conditions of higher temperature and maintain good combustible-gas ignitability. It is accordingly possible to solve the object of the present invention, that is, to make leakage current unlikely to occur in the insulator 3 and provide the spark plug with good combustible-gas ignitability.

The ground electrode 6 is formed into, for example, a prism shape. As shown in FIGS. 1 and 2, the ground electrode 6 is joined at one end thereof to the front end face 4a of the metal shell 4 and is bent into a substantially L-shape so as to situate the other end of the ground electrode 6 toward the direction of the axis AX. By such shape and structure design, the ground electrode 6 is arranged in such a manner that the other end of the ground electrode 6 faces the center electrode 2 via the spark discharge gap G The spark discharge gap G is defined between the front end face of the center electrode 2 and the surface of the ground electrode 6 and is generally set to 0.3 to 1.5 mm. The ground electrode 6 can be preferably formed of a Ni-based alloy of higher heat and corrosion resistance than that of the center electrode 2 due to the fact that the ground electrode 6 is exposed to a higher temperature than the center electrode 2. It suffices in the present invention to join the ground electrode to the front end of the metal shell although the ground electrode 6 is joined to the front end face 4a of the metal shell 4 in the spark plug 1. The ground electrode may alternatively be joined to any region of the front end of the metal shell other than the front end face 4a, for example, a circumferential surface of the front end of the metal shell.

As shown in FIGS. 1 and 2, the insulator 3 has a substantially cylindrical shape and includes a small-diameter leg portion 3e formed on a front end side thereof. The insulator 3 is retained in the metal shell 4 via a talc and/or a packing etc. (not shown). An axial hole is formed in the insulator 3 along the direction of the axis AX so that the center electrode 2 is fixed in the axial hole of the insulator 3. The insulator 3 is fixed in the metal shell 4 with a front end portion of the insulator 3 protruding outside from the front end face 4a of the metal shell 4.

In the spark plug 1, the insulator 3 further includes an insulator base portion 3a inserted in the metal shell 4, a conical frustum-shaped diameter-reduced portion 3b extending toward the front from a front end of the insulator base portion 3a and having an outer diameter gradually decreasing toward the front, and a substantially cylindrical front end portion 3c extending toward the front from a front end of the diameter-reduced portion 3b and having a substantially uniform outer diameter, as clearly shown in FIGS. 1 and 2. The diameter-reduced portion 3b and the front end portion 3c constitute the leg portion 3e on the front end side of the insulator 3. The diameter-reduced portion 3b is surrounded by the metal shell 4 with some clearance left between an outer circumferential surface of the diameter-reduced portion 3b and an inner circumferential surface of the metal shell 4. A rear side of the front end portion 3c resides in the metal shell 4, whereas a front side of the front end portion 3c protrudes outside from the front end face 4a of the metal shell 4. As clearly shown in FIG. 2, there is no particular limitation on the protrusion amount Li of the front end portion 3c from the front end face 4a of the metal shell 4. The protrusion amount Li is determined as appropriate depending on the use of the spark plug 1 and, for example, can be set to 1 mm or more. The upper limit of the protrusion amount Li is determined as appropriate depending on the dimensions of the internal combustion engine and the like and, for example, can be set to 6 mm.

The front end portion 3c of the insulator 3, protruding from the front end face 4a of the metal shell 4, is subjected to a high temperature when the spark plug 1 is mounted to the internal combustion engine. Especially when the spark plug 1 is mounted on the recent high-performance internal combustion engine, the front end portion 3c of the insulator 3 is subjected to a higher temperature so that the insulator 3 itself reaches a high temperature. This can result in a deterioration of the ignitability of the spark plug 1 as mentioned above. In the case where the insulator 3 protrudes by 1 mm or more from the front end face 4a of the metal shell 4 toward the front, the occurrence of leakage current becomes more pronounced so that the ignitability of the spark plug 1 can be significantly deteriorated. In the present invention, a region 3d of the insulator 3 extending from the front end face of the insulator 3 to at least 2 mm rear from the imaginary plane including the front end face 4a of the metal shell 4 is formed of the after-mentioned alumina-based sintered body so as to prevent the occurrence of leakage current in the insulator 3, particularly in the front end portion 3c and the region 3d. The spark plug 1 is thus able to attain good ignitability even in the case where the insulator 3 protrudes by 1 mm or more from the front end face 4a of the metal shell 4 toward the front. It is accordingly possible to solve the object of the present invention, that is, to provide the spark plug with good combustible-gas ignitability even in the case where the insulator 3 protrudes by 1 mm or more from the front end face 4a of the metal shell 4 toward the front.

Although the wall thickness of the insulator 3 is determined as appropriate depending on the nominal diameter of the thread portion 9, the dimensions of the metal shell 4 and the like, it is important in the present invention that the insulator 3 satisfies the condition (1), that is, the insulator 3 has a wall thickness T of 0.3 to 1.1 mm at the imaginary plane including the front end face 4a of the metal shell 4 as shown in FIG. 2. Namely, it is important to control the wall thickness T of the insulator 3 to be 0.3 to 1.1 mm. The insulator 3, particularly the above-mentioned region 3d, may be too small in thickness to prevent leakage current if the wall thickness T is smaller than 0.3 mm. If the wall thickness T exceeds 1.1 mm, the occurrence of leakage current in the insulator 3 can be prevented to some extent. The insulator 3, particularly the above-mentioned region 3d, may however be too large in thickness to be used in the downsized spark plug. The wall thickness T of the region 3d is thus preferably 1.1 mm at maximum in the case where the spark plug 1 is downsized e.g. in such a manner that the nominal diameter of the thread portion 9 is M10 or smaller. As mentioned above, it is important to control the wall thickness T to be 0.3 to 1.1 mm for the purpose of both of downsizing and ignitability improvement of the spark plug 1. The wall thickness T is preferably in the range of 0.5 to 1.1 mm in order to effectively prevent the occurrence of leakage current in the insulator 3, in particular in the region 3d.

As clearly shown in FIG. 2, there is some clearance C formed between the inner circumferential surface of the metal shell 4 and the outer circumferential surface of the insulator 3 in the so-called "ignition part" of the spark plug 1. It is herein preferable that, at the imaginary plane including the front end face 4a of the metal shell 4, the ratio (W/T) of a separation distance W between the insulator 3 and the metal shell 4 to the wall thickness T of the insulator 3 is 1 to 8. If the ratio (W/T) is smaller than 1, the following problem may occur. Upon application of a voltage between the metal shell 4 and the insulator 3, the voltage is divided between the gas phase present in the clearance C and the insulator 3. There is thus a tendency that the voltage exerted to the insulator 3 will significantly decrease in the occurrence of leakage current in the insulator 3. This may result in increase of the leakage current. Further, the separation distance W may become so small as to cause a lateral spark between the outer circumferential surface of the insulator 3 and the inner circumferential surface of the metal shell 4 and thereby deteriorate the ignitability of the spark plug 1 if the ratio (W/T) is smaller than 1. On the other hand, the following problem may occur if the ratio (W/T) exceeds 8. It is conceivable to decrease the wall thickness of the metal shell 4 in order to secure the wall thickness T of the insulator 3 of 0.3 to 1.1 mm as mentioned above. In such a case, however, ground electrode 6 may not be attached as desired to the metal shell 4. The durability of the ground electrode 6 may be deteriorated in the case where the thickness of the ground electrode 6 is decreased to secure the weldability of the ground electrode 6. It is alternatively conceivable to decrease the outer diameter of the center electrode 2 in order to secure the wall thickness T of the insulator 3 of 0.3 to 1.1 mm. In such a case, the durability of the center electrode 2 may be significantly deteriorated. Further, it is difficult to downsize the spark plug in such a manner that the nominal diameter of the thread portion 9 is M10 or smaller because of dimensional limitations if the ratio (W/T) exceeds 8. The spark plug may not function properly in addition to having difficulty in downsizing if the ratio (W/T) exceeds 8. When the ratio (W/T) is in the range of 1 to 8, the spark plug can maintain its basic function properly and attain improvement in ignitability even though it is downsized.

The insulator 3 also satisfies the condition (2). That is, the region 3d of the insulator 3 extending from the front end of the insulator 3 to at least 2 mm rear from the imaginary plane is formed of an alumina-based sintered body containing a Si component, a rare earth element component and components of at least two kinds of Group 2 elements of the periodic table according to IUPAC recommendations 1990 and being substantially free from a B component. When the region 3d is formed of such an alumina-based sintered body, the occurrence of leakage current in the region 3d can be prevented effectively. In suffices in the present invention that the region 3d extends from the front end of the insulator 3 to at least 2 mm rear from the imaginary plane. The region 3d may be the whole of the front end portion 3c, the whole of the leg portion 3e including not only the front end portion 3c but also the diameter-reduced portion 3b, or the whole of the insulator 3. In the spark plug 1, the whole of the insulator 3 is formed of the above alumina-based sintered body in view of the ease of production of the insulator 3.

The alumina-based sintered body contains a Si component, a rare earth element component and components of at least two kinds of Group 2 elements of the periodic table according to IUPAC recommendations 1990 (hereinafter just referred to as "Group 2 element components") and is substantially free from a B component as mentioned above.

The alumina-based sintered body contains, as a main component, an Al component such as generally alumina ($Al_2O_3$). In the present invention, the "main component" refers to a component having the largest content (mass %) among all of the components of the material. As the Al component is contained as the main component, the sintered body exhibits good withstand voltage characteristics, high heat resistance and good mechanical characteristics. The amount of the Al component contained in the alumina-based sintered body is preferably in the range of 85 to 95 mass %, more preferably 92 to 94 mass %, assuming the total amount of the alumina-based sintered body after sintering as 100 mass %. When the content amount of the Al component is in the above range, the alumina-based sintered body can be closely packed to e.g. a relative density of 95% or higher so that the insulator 3 formed of such an alumina-based sintered body exhibits good withstand voltage characteristics. In the present invention, the content amount of the Al component is given in mass % in terms of "alumina ($Al_2O_3$)" as Al oxide.

The Si component is derived from a sintering aid and is present in the form of an oxide, an ion or the like in the alumina-based sintered body. In general, the Si component is molten during sintering so as to form a liquid phase and thereby perform the function of the sintering aid for enhancing close packing of the sintered body. Further, the Si component often forms a low-melting glass at a grain boundary of alumina crystal grains. When the alumina-based sintered body contains not only the Si component but also the other specific components as mentioned later, it becomes more likely that the Si component will form, together with the other components, a high-melting glass than a low-melting glass. The alumina-based sintered body is thus difficult to melt at a low temperature and unlikely to incur migration etc. that can be a cause of dielectric breakdown. The amount of the Si component contained in the alumina-based sintered body is preferably in the range of 1.0 to 5.0 mass % assuming the total amount of the alumina-based sintered body after sintering as 100 mass %. In the present invention, the content amount of the Si component is given in mass % in terms of "$SiO_2$" as Si oxide.

The rare earth element component (hereinafter also referred to as "RE component") is also derived from the sintering aid and is present in the form of an oxide, an ion or the like in the alumina-based sintered body. As the RE component, there can be used a scandium component (also referred to as "Sc component"), an yttrium component (also referred to as "Y component") and a lanthanoid component. Specific examples of the RE component contained in the alumina-based sintered body are a Sc component, an Y component, a lanthanum component (also referred to as "La component"), a cerium component (also referred to as "Ce component"), a praseodymium component (also referred to as "Pr component"), a neodymium component (also referred to as "Nd component"), a promethium component (also referred to as "Pm component"), a samarium component (also referred to as "Sm component"), a europium component (also referred to as "Eu component"), a gadolinium component (also referred to as "Gd component"), a terbium component (also referred to as "Tb component"), a dysprosium component (also referred to as "Dy component"), a holmium component (also referred to as "Ho component"), an erbium component (also referred to as "Er component"), a thulium component (also referred to as "Tm component"), an ytterbium component (also referred to as "Yb component") and a lutetium component (also referred to as "Lu component"). Among others, a La component, a Nd component, a Pr component, a Y component and a Yb component are preferred as the RE component.

The RE component, when contained in the alumina-based sintered body during sintering, functions to prevent excessive alumina grain growth and forms a glass phase with the Si component at the grain boundary. As the glass phase containing the RE component has a high melting point, the formation of such a RE component-containing glass leads to improvements in the withstand voltage characteristics of the alumina-based sintered body under high-temperature conditions and in the high-temperature strength of the alumina-based sintered body. Because of the small ion radius of La, Nd, Pr, Y and Yb, the La component, the Nd component, the Pr component, the Y component and the Yb component can each form a high-melting crystal phase together with the Si component and, at the same time, can easily form an aluminate crystal phase having a high melting point of the order of 2000° C., such as hexaaluminate crystal phase, together with the Al component. A detailed explanation of the aluminate crystal will be given later.

The amount of the RE component contained in the alumina-based sintered body is adjusted as appropriate in view of the formation of the aluminate crystal phase and the sinterability of the raw material powder. For example, the content amount of the RE component is preferably in the range of 0.2 to 5.0 mass % assuming the total amount of the alumina-based sintered body after sintering as 100 mass %. In the present invention, the content amount of the RE component is given in mass % in terms of RE element oxide. More specifically, when the RE component is either La, Nd, Y or Yb component, the content amount of the RE component is given in mass % in terms of "$RE_2O_3$" as RE element oxide. When the RE component is Pr component, the content amount of the RE component is given in mass % in terms of "$Pr_6O_{11}$" as Pr oxide. When two or more kinds of RE components are contained in the alumina-based sintered body, the content amount of the RE components refers to a sum of the content amounts of the respective RE components.

The Group 2 element components are also derived from the sintering aid. It is particularly preferable that the Group 2 element components contain at least two kinds selected from the group consisting of a magnesium component (also referred to as "Mg component"), a calcium component (also referred to as "Ca component"), a strontium component (also referred to as "Sr component") and a barium component (also referred to as "Ba component"). The insulator 3 formed of the alumina-based sintered body can effectively prevent leakage current when any two of the above components are contained as the Group 2 element components in the alumina-based sintered body. It is particularly preferable to contain three of the above components as the Group 2 element components in order for the alumina-based sintered body to attain high sinterability and good withstand voltage characteristics and prevent leakage current under higher-temperature conditions. When the physical properties such as density and composition of the alumina-based sintered body are the same, the likelihood of occurrence of migration of the Group 2 element component decreases in the order of Ba component>Sr component>Ca component>Mg component. It is more particularly preferable to contain the Ba component as the Group 2 element component in order to decrease the likelihood of occurrence of migration, to allow the glass formed at the grain boundary to show high insulation properties under the application of a high voltage and thereby decrease the likelihood of occurrence of electrical breakdown and to prevent the occurrence of leakage current in the insulator 3 even under extreme conditions where the temperature of the insulator 3 reaches e.g. 800° C. or higher. In other words, the Group 2 element components preferably include the Ba component as an essential component in combination with more kinds of components. For example, it is more preferable to select not only the Ba component as the main component but also at least two of the above components other than Ba component as the Group 2 element components and is still more preferable to select the Ba component as the main component as well as at least three of the above components other than Ba component, that is, select all of the above components.

The Mg component is derived from the sintering aid and is present in the form of an oxide, an ion or the like in the alumina-based sintered body so as to perform the function of the sintering aid as in the case of the Si component. Each of the Ba component, the Ca component and the Sr component is also derived from the sintering aid and is present in the form of an oxide, an ion or the like in the alumina-based sintered body so as to not only perform the function of the sintering aid as in the case of the Mg component, but also perform the function of improving the high-temperature strength of the alumina-based sintered body. Thus, the addition of the Group 2 element components makes it possible to improve the withstand voltage characteristics and high-temperature strength of the alumina-based sintered body and lower the sintering temperature of the alumina-based material.

The amount of the Group-2 element components contained in the alumina-based sintered body is preferably 1.0 to 5.0 mass %, assuming the total amount of the alumina-based sintered body after sintering as 100 mass %, in order to allow the alumina-based sintered body to be closely packed even when produced from the raw material powder of relatively large particle size and to impart good withstand voltage characteristics to the insulator of the alumina-based sintered body.

It suffices to control the content amount of the Mg component, the content amount of the Ba component, the content amount of the Ca content and the content amount of the Sr component in such a manner that the sum of the content amounts of the Mg, Ba, Ca and Sr components falls within the above range. For example, the content amount of the Mg component, the content amount of the Ba component, the content amount of the Ca content and the content amount of the Sr component are preferably in the range of 0.01 to 0.5 mass %, 0.1 to 1.6 mass %, 0.1 to 0.9 mass % and 0.2 to 0.9 mass %, respectively, assuming the total amount of the alumina-based sintered body after sintering as 100 mass %. In the present invention, the content amount of each Group 2 element component is given in mass % in terms of Group 2 element oxide, such as "MgO", "BaO", "CaO" or "SrO"; and the content amount of the Group 2 element components refers to a sum of the content amounts of the respective Group 2 element components.

The alumina-based sintered body contains substantially no B component e.g. in the grain boundary phase. The B component oxide such as $B_2O_3$ is more likely to form, together with the Al component, the Si component and/or the Group 2 element components, a low-melting glass having a lower melting point than that of B-oxide-free glass at the grain boundary of alumina crystal grains although the B component performs the function of the sintering aid during sintering. When the B component is not contained in the alumina-based sintered body, the high-melting point glass is formed rather than the low-melting B-oxide-containing glass. Thus, softening of the glass is less likely to occur when the B component is not contained in the alumina-based sintered body than when the B component is contained in the alumina-based sintered body. This makes leakage current unlikely to occur in the insulator 3. It means in the present invention that, when the alumina-based sintered body is substantially free of the B component, the B component is not positively added to the alumina-based sintered body. It does not exclude the case where the B component is contained as unavoidable impurity.

The alumina-based sintered body containing the Al component, the Si component, the rare earth element component and the Group 2 element components satisfies the condition (5). That is, the alumina-based sintered body has an aluminate crystal phase containing the rare earth element component. The aluminate crystal shows a high melting point, has a β-alumina structure and is also called "hexaaluminate crystal". The compositional formula of the aluminate crystal is $RE(2A)_x(Al)_yO_z$ (where x=0 to 2.5; y=11 to 16; z=18 to 28; and 2A indicates the Group 2 element of the periodic table according to IUPAC recommendations 1990). Specific examples of the aluminate crystal phase are those represented by $REAl_{11}O_{18}$ and the like.

In the present invention, the aluminate crystal phase containing the rare earth element component may be replaced with an aluminate crystal phase containing no rare earth element component. As such an aluminate crystal phase, there can be used an aluminate crystal phase containing the Group 2 element component as represented by the compositional formula: $(2A)_x(Al)_yO_z$ (where x, y and z are the same as defined above). Specific examples of the aluminate crystal phase containing the Group 2 element component are those represented by the chemical formulas: $MgAl_{12}O_{19}$, $CaAl_{12}O_{19}$ and the like.

It suffices that the aluminate crystal phase is present in the alumina-based sintered body. There is no particular limitation on the location of the aluminate crystal phase in the alumina-based sintered body. It is however preferable that the aluminate crystal phase extends to the inside of the alumina-based sintered body. It is particularly preferable that the aluminate crystal phase exists at a two-grain boundary and/or triple junction of alumina crystal grains. The aluminate crystal phase, when existing at the grain boundary, functions to prevent softening of the glass component at the grain boundary so that a flow of electric current is unlikely to occur in the glass phase. This makes it possible to prevent the occurrence of leakage current due to softening of the glass phase. When the alumina-based sintered body contains at least one of the La component, the Nd component, the Pr component, the Y component and the Yb component as the RE component, the high-melting aluminate crystal is formed in the alumina-based sintered body. The insulator 3 of such an alumina-based sintered body is thus able to attain good withstand voltage characteristics and high-temperature strength and to prevent leakage current.

The existence of the aluminate crystal phase can be identified by X-ray diffraction using, for example, JCPDS cards. As there are no JCPDS cards of the Pr and Nd components, it is impossible to directly identify of the Pr and Nd components by X-ray diffraction. However, the aluminate crystal containing the Pr or Nd component shows a X-ray diffraction spectrum similar to the JCPDS card (No. 33-699) of the aluminate crystal containing the La component due to the fact the ion radii of $Pr^{3+}$ and $Nd^{3+}$ are substantially equivalent to the ion radius of $La^{3+}$. It is thus feasible to confirm the existence of the aluminate crystal containing the Pr or Nd component by comparison of the X-ray diffraction spectrum with the JCPDS card of the aluminate crystal containing the La component. It is preferable to form the aluminate crystal by deposition during firing as the anisotropic growth of the particles is unlikely to occur during firing.

Preferably, the aluminate crystal exists in the alumina-based sintered body in such a manner that the intensity ratio [aluminate/alumina] of a highest-intensity peak attributed to the aluminate crystal to a highest-intensity peak attributed to the alumina in the X-ray diffraction spectrum is 0.04 or greater in order to effectively prevent the occurrence of leakage current. It is particularly preferable that the aluminate crystal exists in the alumina-based sintered body in such a manner that the intensity ratio is 0.06 or greater. The upper limit of the intensity ratio [aluminate/alumina] is not particularly limited and, for example, can be set to 0.2. The intensity ratio [aluminate/alumina] is determined by, in the X-ray diffraction spectrum, dividing the peak intensity of the highest-intensity peak attributed to the aluminate crystal by the peak intensity of the highest-intensity peak attributed to the alumina. The X-ray diffraction measurement of the alumina-based sintered body can be performed, for example, by using a X-ray diffraction instrument "MiniFlex" manufactured by Rigaku under the conditions of a measurement angle range of 20 to 70°, a voltage of 30 kV, a current of 15 mA, a scan speed of 1 and a step of 0.02.

The alumina-based sintered body containing the Al component, the Si component, the rare earth element component and the Group 2 element components further has a silicate crystal phase containing the Group 2 element components. Specific examples of the silicate crystal phase are those represented by the chemical formula: $(2A)SiO_3$ (where 2A indicates the Group 2 element of the periodic table according to IUPAC recommendations 1990)) and the like. It suffices that the silicate crystal phase is present in the alumina-based sintered body. There is no particular limitation on the location of the silicate crystal phase in the alumina-based sintered body. It is however preferable that the silicate crystal phase extends to the inside of the alumina-based sintered body. It is particularly preferable that the silicate crystal phase exists at a two-grain boundary and/or triple junction of alumina crystal grains. The silicate crystal phase, when existing at the grain boundary, functions to prevent leakage current.

The existence of the silicate crystal phase can also be identified by X-ray diffraction using, for example, JCPDS cards. It is preferable to form the silicate crystal phase by deposition during firing as the anisotropic growth of the particles is unlikely to occur during firing.

Preferably, the silicate crystal exists in the alumina-based sintered body in such a manner that the intensity ratio [silicate/aluminate] of a highest-intensity peak attributed to the silicate crystal to the highest-intensity peak attributed to the aluminate crystal in the X-ray diffraction spectrum is 0.32 or greater in order to effectively prevent the occurrence of leakage current. The intensity ratio [silicate/aluminate] is determined by, in the X-ray diffraction spectrum, dividing the peak intensity of the highest-intensity peak attributed to the silicate crystal by the peak intensity of the highest-intensity peak attributed to the aluminate crystal. The upper limit of the intensity ratio [silicate/aluminate] is not particularly limited and, for example, can be set to 0.8. The X-ray diffraction measurement of the alumina-based sintered body can be performed under the same conditions as mentioned above.

The alumina-based sintered body containing the Al component, the Si component, the rare earth element component and the Group 2 element components satisfies the condition (3). That is, the ratio $R_{RE}$ of a mass of the rare earth element component (in terms of oxide) to a total mass of the Si component, the Group 2 element components and the rare earth element component (in terms of oxides) in the alumina-based sintered body is 0.15 to 0.45. If the mass ratio $R_{RE}$ of the rare earth element component is smaller than 0.15, the aluminate crystal may not be formed in such a manner as to attain an intensity ratio [aluminate/alumina] of 0.04 or greater and fail to prevent the occurrence of leakage current. If the mass ratio $R_{RE}$ of the rare earth element component exceeds 0.45, the sinterability of the raw material powder may be deteriorated so that the resulting alumina-based sintered body becomes so porous as to increase the occurrence of leakage current. It is thus important in the present invention that the mass ratio $R_{RE}$ is in the range of 0.15 to 0.45 in order to prevent the occurrence of leakage current in the insulator 3 by the formation of the aluminate crystal phase at the grain boundary of the closely packed alumina-based sintered body. The mass ratio $R_{RE}$ is preferably in the range of 0.2 to 0.45 in order to prevent leakage current effectively.

The alumina-based sintered body containing the Al component, the Si component, the rare earth element component and the Group 2 element components also satisfies the condition (4). That is, the ratio $R_2$ of a total mass of the Group 2 element components (in terms of oxides) to a mass of the Si component (in terms of oxide) in the alumina-based sintered body is 0.25 or greater. If the mass ratio $R_2$ is smaller than 0.25, the sinterability of the raw material powder may be deteriorated so that the resulting alumina-based sintered body becomes so porous as to increase the occurrence of leakage current due to electric field concentration in pores of the alumina-based sintered body. It is thus important in the present invention that the mass ratio $R_2$ is 0.25 or greater in order to prevent the occurrence of leakage current in the insulator 3 by the formation of the aluminate crystal phase and/or silicate crystal phase at the grain boundary of the closely packed alumina-based sintered body.

The aluminate crystal phase and/or silicate crystal phase, in which the Group 2 element components are less likely to migrate, can be easily formed when the mass ratio $R_2$ is in the range of 0.25 to 1.0. Further, the amount of existence of the aluminate crystal phase and/or silicate crystal phase can be controlled to within the above range. The mass ratio $R_2$ is thus preferably in the range of 0.25 to 1.0 in order to prevent the occurrence of leakage current in the insulator 3 even under extreme conditions where the temperature of the insulator 3 reaches e.g. 800° C. or higher. It is accordingly possible to solve the object of the present invention, that is, provide the spark plug with good combustible-gas ignitability even in a high-temperature range that the temperature of the insulator 3 reaches 800° C. or higher when the mass ratio $R_2$ is in the range of 0.25 to 1.0.

Each of the content amounts of the Al component, the Si component, the RE component and the Group 2 element components in the alumina-based sintered body can be measured in units of mass or mass % in terms of oxide by quantitative analysis, X-ray fluorescence analysis or chemical analysis using an electron probe microanalyzer (EPMA) or energy dispersive type microanalyzer (EPMA/EDS). In the present invention, the measurement results of the alumina-based sintered body by quantitative analysis, X-ray fluorescence analysis or chemical analysis are approximately in agreement with the composition of the raw material powder used for formation of the alumina-based sintered body.

The alumina-based sintered body is substantially formed of the Al component, the Si component, the RE component and the Group 2 element components. Herein, the term "substantially" means that any component other than the above-mentioned components is not actively added. The alumina-based sintered body may thus contain unavoidable impurities within the range that does not hinder the object of the present invention. Examples of the unavoidable impurities are Na, S, N and the like. It is preferable that the content amount of the unavoidable impurities is as small as possible. More specifically, it is preferable that the content amount of the unavoidable impurities is 1 part by mass or less relative to 100 parts by mass of the total mass of the Al component, the Si component, the Group 2 element components and the RE component. The alumina-based sintered body may contain, in addition to the unavoidable impurities, the Al component, the Si component, the Group 2 element components and the RE component, a small amount of other component such as Ti component, Mn component, Ni component or the like.

It is preferable that the alumina-based sintered body has a closely packed structure and, more specifically, has a relative density (also referred to as "theoretical density ratio") of 95% or higher. When the relative density is 95% or higher, the alumina-based sintered body is highly closely packed to have very few pores that become a starting point of breakdown. The insulator 3 of such an alumina-based sintered body can attain good withstand voltage characteristics as dielectric breakdown is unlikely to occur in the insulator 3. It is particularly preferable that the alumina-based sintered body has a relative density of 95.5% or higher in order to attain better withstand voltage characteristics. Herein, the theoretical density refers to a density of the alumina-based sintered body as determined based on the mixing rules from the content amounts of the respective components in terms of oxides; and the relative density refers to the ratio, expressed as a percentage, of a density of the alumina-based sintered body measured based on the Archimedes principle to the theoretical density of the alumina-based sintered body. The upper limit of the relative density of the alumina-based sintered body is thus 100%. The higher the relative density, the more closely packed the alumina-based sintered body.

In the spark plug 1, the composition and properties of the insulator 3 are the same as those of the alumina-based sintered body as the whole of the insulator 3 is formed of the alumina-based sintered body. As mentioned above, the spark plug 1 satisfies all of the conditions (1) to (5) and has the insulator 3 formed of the aluminate crystal-containing alumina-based sintered body. The occurrence of leakage current in the insulator 3 can be thus prevented even when the spark plug 1 is downsized. It is accordingly possible in the present invention to provide the spark plug with good combustible-gas ignitability even when the spark plug is downsized and to provide the downsized spark plug with good combustible-gas ignitability by prevention of leakage current in the insulator 3. It is also possible in the present invention to provide the downsized spark plug with good combustible-gas ignitability even when the spark plug is mounted on the recent complicated internal combustion engine, high-output internal combustion engine or downsized internal combustion engine. It is further possible in the present invention to provide the downsized spark plug with good combustible-gas ignitability even when the spark plug is mounted on the internal combustion engine in which the insulator 3 is heated to a high temperature of 800° C. or higher.

The present invention is characterized in that: the content amounts of the respective components in the alumina-based sintered body of the insulator are controlled so as to satisfy the mass ratios $R_{RE}$ and $R_2$ and form the aluminate crystal in the glass phase; and the wall thickness T of the insulator 3 is controlled to within the given range as mentioned above. Because of these characteristic features, the spark plug 1 is able to prevent leakage current in the insulator 3 and secure good ignitability even when the spark plug 1 is downsized.

A manufacturing method of the spark plug according to the present invention includes the step of producing the insulator by preparing a raw material powder containing an Al compound powder as a main component, a Si compound powder, a rare earth element compound powder and a powder of compounds of at least two kinds of Group 2 elements of the periodic table according to IUPAC recommendations 1990 (hereinafter just referred to as "Group 2 element compound powder") but not containing a B compound powder, press-forming the prepared raw material powder into a given body and sintering the press-formed body. The manufacturing method of the spark plug according to the present invention will be described in detail below.

In the manufacturing method of the spark plug, the raw material powder is first prepared by mixing the raw powders, that is, the Al compound powder, the Si compound powder, the rare earth element compound powder and the Group 2 element compound powder together into a slurry. In some cases, a powder of the same material as the Al component, a powder of the same material as the Si component, a powder of the same material as the RE component and a powder of the same materials as the Group 2 element components may be mixed together. (These powders are also referred to as "raw powders".) The mixing ratio of the respective raw powders can be set to the same as the composition ratio of the respective components. The mixing of the raw powders is preferably performed for 8 hours or more in order to ensure the uniform mixed state of the raw material powder and produce the highly closely packed sintered body.

There is no particular limitation on the Al compound powder as long as the Al compound powder is capable of being converted to the Al component during the sintering. In general, alumina ($Al_2O_3$) powder is used as the Al compound powder. It is preferable to use the Al compound powder of high purity although the Al compound powder may contain practically unavoidable impurities such as Na. For example, the purity of the Al compound powder is preferably 99.5% or higher. It is also generally preferable that the Al compound powder has an average particle size of 0.1 to 5.0 μm for close packing of the alumina-based sintered body. The average particle size is herein determined by laser diffraction (using a microtrack particle size analyzer (MT-3000) available from Nikkiso Co., Ltd.).

There is no particular limitation on the Si compound powder as long as the Si compound powder is capable of being converted to the Si component during the sintering. As the Si compound powder, there can be used various inorganic powders of oxide (including composite oxide), hydroxide, carbonate, chloride, sulfate, nitrate and phosphate of Si. In general, $SiO_2$ powder is used as the Si compound powder. In the case where the Si compound powder is any kind of powder other than oxide powder, the amount of the Si compound powder used is counted in mass % in terms of oxide. The purity and average particle size of the Si compound powder are basically similar to those of the Al compound powder.

There is also no particular limitation on the rare earth element compound powder as long as the rare earth element compound powder is capable of being converted to the RE component during the sintering. For example, there can be used powders of oxides and composite oxides of rare earth elements as the rare earth element compound powder. In the case where the rare earth element compound powder is any kind of powder other than oxide powder, the amount of the rare earth element compound powder used is counted in mass % in terms of oxide. The purity and average particle size of the rare earth element compound powder are also basically similar to those of the Al compound powder.

Further, there is no particular limitation on the Group 2 element compound powder as long as the Group 2 element compound powder is capable of being converted to the Group 2 element components during the sintering. There can be used various inorganic powders of oxides (including composite oxides), hydroxides, carbonates, chlorides, sulfates and phosphates of Group 2 elements. The Group 2 element compound powder is a mixed powder of at least two kinds of compounds, preferably a mixed powder of at least three kinds of compounds. It is particularly preferable that the Group 2 element compound powder contains a Ba compound powder. Preferred combinations of the components of the Group 2 element compound powder are basically the same as those of the Group 2 element components in the alumina-based sintered body. Specific examples of the Group 2 element compound powder are: Mg compound powders such as MgO powder and $MgCO_3$ powder; Ba compound powders such as BaO powder and $BaCO_3$ powder; Ca compound powders such as CaO powder and $CaCO_3$ powder; and Sr compound powders such as SrO powder and $SrCO_3$ powder. In the case where the Group 2 element compound powder is any kind of powder other than oxide powder, the amount of the Group 2 element compound powder used is counted in mass % in terms of oxide. The purity and average particle size of the Group 2 element compound powder are also basically similar to those of the Al compound powder.

In the spark plug manufacturing method of the present invention, it is preferable to prepare the raw material powder by mixing the Al compound powder, the Si compound powder, the Group 2 element compound powder and the rare earth element compound powder in such a manner as to satisfy the following condition (A) in view of the average particle size and particle size distribution of each of these compound powders. Hereinafter, the manufacturing method of the spark plug according to the present invention in which the raw material powder is prepared to satisfy the condition (A) may be referred to as "preferred spark plug manufacturing method". Condition (A): The particle size distribution ratio (90% volume diameter/10% volume diameter) between particles of 10% volume diameter and particles of 90% volume diameter in the raw material powder is 3.6 to 5.2.

When the particle size distribution ratio (90% volume diameter/10% volume diameter) is 3.6 to 5.2, the alumina-based sintered body can be produced with high repeatability in such a manner as to maintain high relative density and to allow not only favorable deposition of the aluminate crystal according to the condition (5) but also favorable deposition of the silicate crystal. If the particle size distribution ratio (90% volume diameter/10% volume diameter) is lower than 3.6, the particle size of the raw material powder is so small that the raw material powder may undergo excessive sintering. The reactivity of the particles in the raw material powder is also so high that the glass phase, rather than the aluminate crystal, may be formed in the alumina-based sintered body. Thus, the alumina-based sintered body may not occasionally be produced with high repeatability by sintering of the raw material powder in such a manner as to maintain high relative density and allow favorable deposition of the aluminate crystal and optionally the silicate crystal. If the glass phase rather than the aluminate crystal is formed in the alumina-based sintered body, the alumina-based sintered body may not provide sufficient strength due to abnormal growth of alumina grains and the like and may not provide sufficient withstand voltage characteristics due to failure to prevent leakage current effectively. On the other hand, if the particle size distribution ratio (90% volume diameter/10% volume diameter) exceeds 5.2, the reactivity of the particles in the raw material powder is so low as to cause a deterioration of the sinterability of the raw material powder and, by extension, the relative density of the alumina-based sintered body. Thus, the alumina-based sintered body may not occasionally be produced with high repeatability by sintering of the raw material powder in such a manner as to maintain high relative density and allow favorable deposition of the aluminate crystal and optionally the silicate crystal. If there is no or less aluminate crystal and/or silicate crystal formed in the alumina-based sintered body, the alumina-based sintered body may not provide ignitability, withstand voltage, sinterability, strength and the like properly. As mentioned above, the preparation of the raw material powder from the raw powders according to the condition (A) leads to high-repeatability production of the alumina-based sintered body having high relative density with favorable deposition of the aluminate crystal and optionally the silicate crystal, that is, high-repeatability production of the insulator 3 in which leakage current is unlikely to occur as mentioned later. It is accordingly possible to enable high-yield manufacturing of the spark plug with good combustible-gas ignitability.

In the preferred spark plug manufacturing method of the present invention, the 10% volume diameter and the 90% volume diameter refer to, when determining a cumulative curve indicating the relationship between particle size and cumulative volume of particles on the assumption that the total volume of particles in the raw material powder is 100%, a particle size at which the cumulative volume of particles reaches 10% in the cumulative curve and a particle size at which the cumulative volume of particles reaches 90% in the cumulative curve, respectively. The particle size of particles in the raw material powder can be measured by laser diffraction (using a microtrack particle size analyzer (MT-3000) available from Nikkiso Co., Ltd.).

In the manufacturing method of the spark plug and, in particular, in the preferred spark plug manufacturing method, it is preferable to prepare the raw material powder by mixing the Al compound powder, the Si compound powder, the Group 2 element compound powder and the rare earth element compound powder in such a manner as to satisfy the following condition (B) so that the resulting alumina-based sintered body can meet the condition (3).

Condition (B): The mass ratio $R_{RE}$ of a mass of the rare earth element compound powder (in terms of oxide) to a total mass of the Group 2 element compound powder and the rare earth element compound powder (in terms of oxides) is preferably 0.15 to 0.45, more preferably 0.2 to 0.45.

In the manufacturing method of the spark plug and, in particular, in the preferred spark plug manufacturing method, it is also preferable to prepare the raw material powder by mixing the Al compound powder, the Si compound powder, the Group 2 element compound powder and the rare earth element compound powder in such a manner as to satisfy the following condition (C) so that the resulting alumina-based sintered body can meet the condition (4).

Condition (C): The mass ratio $R_2$ of a total mass of the Group 2 element compound powder (in terms of oxide) to a mass of the Si compound powder (in terms of oxide) is preferably 0.25 or greater, more preferably 0.25 to 1.0.

After the mixing of the raw powders, the resulting raw material powder may be dispersed into a solvent and admixed with a hydrophilic binding agent so as to form a slurry of the raw material powder. Namely, the hydrophilic binding agent may be added as a binder to the raw material powder. Examples of the hydrophilic binding agent are polyvinyl alcohol, water-soluble acrylic resin, gum arabic, dextrin and the like. Examples of the solvent for dispersion of the raw material powder are water, alcohol and the like. Each of the hydrophilic binding agent and the solvent can be used singly or in combination of two or more kinds thereof. The amount of the hydrophilic binding agent used is generally 0.1 to 7 parts by mass, preferably 1 to 5 parts by mass, per 100 parts by mass of the raw material powder. The amount of the water used as the solvent is generally 40 to 120 parts by mass, preferably 50 to 100 parts by mass, per 100 parts by mass of the raw material powder.

The thus-obtained slurry has an average particle size of e.g. 1.4 to 5 μm and preferably has a particle size distribution ratio (90% volume diameter/10% volume diameter) of 3.6 to 5.2. It is more preferable that the slurry satisfies at least either one of the conditions (B) and (C).

Subsequently, the slurry is subjected to spray drying and thereby granulated to an average particle size of 30 to 200 μm, preferably 50 to 150 μm. This average particle size refers to a measurement value obtained by laser diffraction (using a microtrack particle size analyzer (MT-3000) available from Nikkiso Co., Ltd.).

The granulated raw material powder is molded into a green compact body by e.g. rubber press forming. The green compact body is shaped by grinding with e.g. resinoid grindstone. As the green compact body is formed of the granulated powder of relative large average particle size, the green compact body shows good workability and thus can be easily grinded into a given shape with high productivity.

The green compact body, after grinded into the desired shape, is sintered by firing in the air at 1450 to 1650° C. for 1 to 8 hours, and then, finished with a glaze by firing. With this, the alumina-based sintered body is completed. When the firing temperature is 1450 to 1650° C., the alumina-based sintered body can secure withstand voltage characteristics and mechanical strength due to proper close packing of the sintered body and less abnormal grain growth of the alumina component. The thus-obtained alumina-based sintered body may be again subjected to shaping as desired. In this way, the insulator 3 of the spark plug 1 is produced of the alumina-based sintered body.

The spark plug 1 is manufactured, for example, by the following procedure. The center electrode 2 and the ground electrode 6 are each produced by processing an electrode material such as Ni-based alloy into a given shape and dimensions. The preparation and processing of the electrode material may be performed successively. For example, it is feasible to produce each of the center electrode 2 and the ground electrode 6 by preparing a molten Ni-based alloy of desired composition with a vacuum melting furnace, vacuum-casting the molten N-based alloy into an ingot, and then, forming the ingot into a given shape and dimensions as appropriate by hot working, drawing etc. Alternatively, the center electrode 2 can be produced by inserting the rod-shaped inner electrode member 8 into the cup-shaped outer electrode member 7 and subjecting the resulting electrode material to plastic working such as extrusion.

The metal shell 4 is also produced into a give shape and dimensions by plastic working etc. The ground electrode 6 is joined at one end thereof to the front end face of the metal shell 4 by electric resistance welding etc. Further, the center electrode 2 is fixed into the insulator 3 by a known process. The insulator 3 is then fixed into the metal shell 4 to which the ground electrode 6 has been joined. The ground electrode 6 is bent at its front side in such a manner that the other end of the ground electrode 6 faces the front end of the center electrode 2. With this, the spark plug 1 is completed.

In the manufacturing method of the spark plug and, in particular, in the preferred spark plug manufacturing method, the shape and dimensions of each of the center electrode 2, the insulator 3, the metal shell 4 and the ground electrode 6 can be controlled so as to satisfy the conditions or dimensions such as the condition (1) and the separation distance ratio (W/T) and the structure of the spark plug 1 as exemplified above.

The manufacturing method of the spark plug and, in particular, the preferred spark plug manufacturing method includes the step of producing the insulator by preparing the mixed raw material powder so as to satisfy the condition (A), and then, sintering the prepared raw material powder. This leads to high-repeatability production of the alumina-based sintered body having high relative density with favorable deposition of the aluminate crystal and optionally the silicate crystal, that is, high-repeatability production of the insulator 3 in which leakage current is unlikely to occur for manufacturing of the spark plug with the insulator 3. As mentioned above, the spark plug can be manufactured so as to make leakage current unlikely to occur in the insulator 3 and attain good combustible-gas ignitability by satisfaction of all of the conditions (1) to (5) in the manufacturing method of the spark plug and, in particular, the preferred spark plug manufacturing method. Especially in the preferred spark plug manufacturing method, the aluminate crystal can be deposited favorably with high repeatability in the alumina-based sintered body so as to prevent the occurrence of leakage current in the alumina-based sintered body effectively. This enables high-yield manufacturing of the spark plug with the insulator 3 in which leakage current is highly unlikely to occur even when the condition (1) regarding the wall thickness T and the ratio (W/T) of the separation distance W to the wall thickness T are not in the above-mentioned ranges and even when the exemplified structure of the spark plug 1 is not satisfied. It is accordingly possible in the present invention to provide the method for high-yield manufacturing of the spark plug with good combustible-gas ignitability.

In the manufacturing method of the spark plug according to the present invention and, in particular, the preferred spark plug manufacturing method, leakage current is highly unlikely to occur in the insulator as mentioned above not only when the insulator is designed for use in the ordinary spark plug but also when the insulator is decreased in thickness for use in the downsized spark plug. Thus, the wall thickness of the insulator 3 is determined as appropriate depending on the nominal diameter of the thread portion 9, the dimensions of the metal shell 4 and the like in the manufacturing method of the spark plug according to the present invention and, in particular, the preferred spark plug manufacturing method. For example, the wall thickness T of the insulator 3 is preferably 0.3 to 1.1 mm when the insulator 3 is used in the downsized spark plug. The ratio (W/T) of the separation distance between the insulator 3 and the metal shell 4 to the wall thickness T of the insulator 3 is also determined as appropriate in the manufacturing method of the spark plug according to the present invention and, in particular, the preferred spark plug manufacturing method. For example, the ratio (W/T) of the separation distance W is preferably 1 to 8 in the downsized spark plug. In the manufacturing method of the spark plug according to the present invention and, in particular, the preferred spark plug manufacturing method, the spark plug can attain high heat resistance and prevent leakage current even under extreme conditions of higher temperature when the center electrode 2 is formed by embedding the inner electrode member 8 in the outer electrode member 7 in such a manner that, when the center electrode 2 is retained in the insulator 3, the inner electrode member 8 extends to or over the imaginary plane including at least the front end face 4a of the metal shell 4 and more preferably extends to the front side of the imaginary plane as in the case of the spark plug 1 shown in FIGS. 1 and 2. It is thus possible in the present invention to provide the method for high-yield manufacturing of the spark plug with good combustible-gas ignitability. As the insulator 3 is produced from the raw material powder as mentioned above in the manufacturing method of the spark plug according to the present invention and, in particular, the preferred spark plug manufacturing method, the spark plug can attain good combustible-gas ignitability even in the case where the insulator 3 protrudes by 1 mm or more toward the front from the front end face 4a of the metal shell 4. It is thus possible in the present invention to provide the method for manufacturing the spark plug with high yield as desired so as to attain good combustible-gas ignitability even in the case where the insulator 3 protrudes by 1 mm or more toward the front from the front end face 4a of the metal shell 4.

In the manufacturing method of the spark plug according to the present invention and, in particular, the preferred spark plug manufacturing method, the insulator in which leakage current is highly unlikely to occur can be produced with high yield as desired. Namely, the occurrence of leakage current in the insulator can be prevented effectively not only when the insulator is designed for use in the ordinary spark plug but also when the insulator is decreased in thickness for use in the downsized spark plug. It is thus possible in the present invention to provide the method for manufacturing the spark plug with high yield as desired so as to attain good combustible-gas ignitability even when the spark plug is downsized e.g. in such a manner that the nominal diameter of the thread portion 9 is M10 or smaller and to provide the method for manufacturing the downsized spark plug with high yield as desired so as to highly prevent the occurrence of leakage current in the insulator 3 and attain good combustible-gas ignitability.

It is further possible in the present invention to provide the method for high-yield manufacturing of the downsized spark plug with good combustible-gas ignitability even when the spark plug is mounted on the recent complicated internal combustion engine, high-output internal combustion engine or downsized internal combustion engine. Furthermore, it is possible in the present invention to provide the method for high-yield manufacturing of the downsized spark plug with good combustible-gas ignitability even when the spark plug 3 is mounted on the internal combustion engine in which the insulator 3 is heated to a high temperature of 800° C. or higher.

The spark plug according to the present invention is used in the automotive internal combustion engine such as gasoline engine. The spark plug is fixed in position on the internal combustion engine by screwing the thread portion 9 into a thread hole of the cylinder head that defines a combustion chamber of the internal combustion engine.

The spark plug according to the present invention and the manufacturing method of the spark plug according to the present invention are not limited to the above embodiments and can be modified within the range that achieves the objects of the present invention. Although the spark plug 1 is provided with the center electrode 2 and the ground electrode 6, a noble metal tip may be joined to the front end portion of the center electrode and/or the surface of the ground electrode. Each of the noble metal tip joined to the front end portion of the center electrode and the noble metal tip joined the surface of the ground electrode is generally formed into a cylindrical shape of appropriately adjusted dimensions. The noble metal tips can be fused by any appropriate welding process such as laser welding or electric resistance welding to the front end portion of the center electrode and to the surface of the ground electrode. In this case, the spark gap is defined between the noble metal tip joined to the front end portion of the center electrode and the noble metal tip joined to the surface of the ground electrode. As the material of the noble metal tip, there can be used noble metal materials such Pt, Pt alloy, Ir and Ir alloy.

EXAMPLES (Production of Alumina-Based Sintered Bodies)

A raw material powder was prepared by mixing an alumina powder, a Si compound powder, any of a Ca compound powder, a Mg compound powder, a Ba compound powder and a Sr compound powder as a Group 2 element compound powder, a rare earth element compound powder and optionally a B compound powder (Sample No. 2). (The kinds of the raw powders mixed for preparation of the raw material powder are indicated in Table 1.). The average particle size of the alumina powder was 2.1 μm, whereas the average particle size of each of the Si compound powder, the Group 2 element compound powder and the rare earth element compound powder was in the above-mentioned range. The raw material powder was formed into a slurry by the addition of a hydrophilic binding agent such as polyvinyl alcohol and water as a solvent.

The slurry was subjected to spray drying, thereby granulating the raw material powder to spherical particles having an average particle size of about 100 μm. The granulated raw material powder was molded into a green compact body as an insulator precursor by rubber press forming. The green compact body was sintered by firing in the air under the conditions of a firing temperature of 1450 to 1650° C. and a firing time of 1 to 8 hours. After that, the sintered molded body was finished by firing with a glaze. Each of alumina-based sintered bodies of Sample Nos. 1 to 55 was produced by the above procedure. The firing conditions were set to the same within the above ranges. In Table 1-1 and Table 1-2, the samples marked with * are comparative examples in which the condition (2) regarding the composition, the condition (3) regarding the mass ratio $R_{RE}$, the condition (4) regarding the mass ratio $R_2$ and/or the condition (5) was not satisfied. (Table 1-1 and Table 1-2 together may be referred to as "Table 1".)

(Measurements of Component Amounts)

The composition of the alumina-based sintered body, that is, the amounts of the respective components contained in the alumina-based sintered body was measured by quantitative analysis using EPMA. Each of the content amounts of the respective components was determined in units of mass percent (%) assuming the sum of the measured content amounts of the respective components in the insulator as 100 mass %. The measurement results of "the composition of the alumina-based sintered body (mass % in terms of oxide)" are indicated in Table 1. The sum of the content amounts of the Si component, the Group 2 element components and the rare earth element component was determined as "total sintering aid amount (mass % in terms of oxide)". The determination results of the total sintering aid amount are indicated in Table 1. Further, the mass ratios $R_{RE}$ and $R_2$ were determined. The determination results of the mass ratios $R_{RE}$ and $R_2$ are also indicated in Table 1. Herein, the content amounts of the respective components as indicated in Table 1 were substantially in agreement with the amounts of the raw powders mixed.

(Measurement of Relative Density)

Each of the alumina-based sintered bodies of Sample Nos. 1 to 55 was tested for the relative density by the following procedure. The density of the alumina-based sintered body based on the Archimedes principles was measured according to the apparent density measurement method defined in JIS R1634 (1998). The density of the alumina-based sintered body based on the mixing rules was also measured. Then, the ratio of the density of the alumina-based sintered body based on the Archimedes principles to the density of the alumina-based sintered body based on the mixing rules was determined as the relative density. The determination results of the relative density are indicated in Table 1.

(Aluminate Crystal Phase)

Each of the alumina-based sintered bodies of Sample Nos. 1 to 55 was tested for the existence of aluminate crystal by the following procedure. A cross section of the alumina-based sintered body was subjected to grinding, and then, analyzed by X-ray diffraction according to the above-mentioned method using an X-ray diffraction instrument (model: Mini-Flex) manufactured by Rigaku Corporation. The existence or absence of an aluminate crystal phase in the alumina-based sintered body was determined by comparison of the X-ray diffraction analysis chart with a JCPDS card. Further, the intensity ratio [aluminate/alumina] was determined from the X-ray diffraction analysis chart according to the above-mentioned method. (The intensity ratio [aluminate/alumina] is referred to as "aluminate crystal phase: intensity ratio" in Table 1.) These results are indicated in Table 1. In Table 1, the symbol "○" indicates the existence of the aluminate crystal phase; and the symbol "x" indicates the absence of the aluminate crystal phase.

(Silicate Crystal Phase)

Each of the alumina-based sintered bodies of Sample Nos. 1 to 55 was analyzed by X-ray diffraction in the same manner as in the determination of the existence of the aluminate crystal phase. The existence or absence of a silicate crystal phase "(2A)SiO$_3$ (where 2A indicates the Group 2 element of the periodic table according to IUPAC recommendations 1990)" was determined by comparison of the X-ray diffraction analysis chart with a JCPDS card. (The silicate crystal phase is referred to as "2ASiO$_3$" in Table 1.) Further, the intensity ratio [silicate/alumina] was determined from the X-ray diffraction analysis chart according to the above-mentioned method. (The intensity ratio [silicate/alumina] is referred to as "2ASiO$_3$ crystal phase: intensity ratio" in Table 1.) These results are indicated in Table 1. In Table 1, the symbol "○" indicates the existence of the silicate crystal phase; and the symbol "x" indicates the absence of the silicate crystal phase.

TABLE 1-1

| | Composition (mass % in terms of oxide) | | | | | | | | | | | | |
|---|---|---|---|---|---|---|---|---|---|---|---|---|---|
| Sample | $Al_2O_3$ | $SiO_2$ | MgO | BaO | CaO | SrO | $La_2O_3$ | $Nd_2O_3$ | $Pr_6O_{11}$ | $Y_2O_3$ | $Yb_2O_3$ | $B_2O_3$ | Total sintering aid amount |
| *No. 1 | 94.77 | 2.67 | 0.10 | 0.29 | 2.17 | | | | | | | | 5.23 |
| *No. 2 | 93.51 | 3.45 | 0.26 | 0.92 | 0.48 | | 1.28 | | | | | 0.1 | 6.39 |
| *No. 3 | 93.61 | 4.79 | 0.15 | 0.53 | 0.28 | | 0.64 | | | | | | 6.39 |
| *No. 4 | 93.61 | 4.53 | 0.14 | 0.50 | 0.26 | | 0.96 | | | | | | 6.39 |
| *No. 5 | 93.61 | 4.26 | 0.13 | 0.47 | 0.25 | | 1.28 | | | | | | 6.39 |
| *No. 6 | 93.61 | 2.93 | 0.09 | 0.32 | 0.17 | | 2.88 | | | | | | 6.39 |
| *No. 7 | 93.61 | 4.60 | 0.18 | 0.64 | 0.33 | | 0.64 | | | | | | 6.39 |
| *No. 8 | 93.61 | 2.88 | 0.45 | 1.59 | 0.83 | | 0.64 | | | | | | 6.39 |
| No. 9 | 93.61 | 4.35 | 0.17 | 0.60 | 0.31 | | 0.96 | | | | | | 6.39 |
| No. 10 | 93.61 | 2.72 | 0.43 | 1.50 | 0.79 | | 0.96 | | | | | | 6.39 |
| No. 11 | 93.61 | 4.09 | 0.16 | 0.57 | 0.30 | | 1.28 | | | | | | 6.39 |
| No. 12 | 93.61 | 3.45 | 0.26 | 0.92 | 0.48 | | 1.28 | | | | | | 6.39 |
| No. 13 | 93.61 | 2.56 | 0.40 | 1.41 | 0.74 | | 1.28 | | | | | | 6.39 |
| No. 14 | 93.61 | 2.81 | 0.11 | 0.39 | 0.20 | | 2.88 | | | | | | 6.39 |
| No. 15 | 93.61 | 1.76 | 0.28 | 0.97 | 0.51 | | 2.88 | | | | | | 6.39 |
| No. 16 | 93.61 | 2.59 | 0.45 | 1.57 | 0.82 | | 0.96 | | | | | | 6.39 |
| No. 17 | 93.61 | 2.43 | 0.42 | 1.48 | 0.78 | | 1.28 | | | | | | 6.39 |
| No. 18 | 93.61 | 1.67 | 0.29 | 1.02 | 0.53 | | 2.88 | | | | | | 6.39 |
| *No. 19 | 93.61 | 2.56 | 0.10 | 0.35 | 0.18 | | 3.20 | | | | | | 6.39 |
| *No. 20 | 93.61 | 1.60 | 0.25 | 0.88 | 0.46 | | 3.20 | | | | | | 6.39 |
| *No. 21 | 93.61 | 1.52 | 0.26 | 0.92 | 0.48 | | 3.20 | | | | | | 6.39 |
| *No. 22 | 93.61 | 4.79 | 0.15 | 0.53 | 0.28 | | | 0.64 | | | | | 6.39 |
| *No. 23 | 93.61 | 4.53 | 0.14 | 0.50 | 0.26 | | | 0.96 | | | | | 6.39 |
| No. 24 | 93.61 | 4.35 | 0.17 | 0.60 | 0.31 | | | 0.96 | | | | | 6.39 |
| No. 25 | 93.61 | 3.45 | 0.26 | 0.92 | 0.48 | | | 1.28 | | | | | 6.39 |
| No. 26 | 93.61 | 1.76 | 0.28 | 0.97 | 0.51 | | | 2.88 | | | | | 6.39 |
| No. 27 | 93.61 | 1.67 | 0.29 | 1.02 | 0.53 | | | 2.88 | | | | | 6.39 |
| *No. 28 | 93.61 | 1.52 | 0.26 | 0.92 | 0.48 | | | 3.20 | | | | | 6.39 |

| Sample | Mass ratio $R_{RE}$ | Mass ratio $R_2$ | Aluminate crystal phase Existence | Aluminate crystal phase Intensity ratio | $2ASiO_3$ crystal phase Existence | $2ASiO_3$ crystal phase Intensity ratio | Relative density (%) |
|---|---|---|---|---|---|---|---|
| *No. 1 | 0.00 | 0.96 | X | X | ○ | 0.72 | 94.9 |
| *No. 2 | 0.20 | 0.48 | ○ | 0.05 | ○ | 0.68 | 96.3 |
| *No. 3 | 0.10 | 0.20 | ○ | 0.03 | ○ | 0.28 | 95.4 |
| *No. 4 | 0.15 | 0.20 | ○ | 0.04 | ○ | 0.29 | 95.3 |
| *No. 5 | 0.20 | 0.20 | ○ | 0.05 | ○ | 0.25 | 95.3 |
| *No. 6 | 0.45 | 0.20 | ○ | 0.12 | ○ | 0.26 | 94.9 |
| *No. 7 | 0.10 | 0.25 | ○ | 0.03 | ○ | 0.30 | 96.1 |
| *No. 8 | 0.10 | 1.00 | ○ | 0.02 | ○ | 0.60 | 96.3 |
| No. 9 | 0.15 | 0.25 | ○ | 0.04 | ○ | 0.35 | 96.2 |
| No. 10 | 0.15 | 1.00 | ○ | 0.04 | ○ | 0.58 | 96.3 |
| No. 11 | 0.20 | 0.25 | ○ | 0.06 | ○ | 0.32 | 96.3 |
| No. 12 | 0.20 | 0.48 | ○ | 0.06 | ○ | 0.45 | 96.1 |
| No. 13 | 0.20 | 1.00 | ○ | 0.07 | ○ | 0.60 | 96.0 |
| No. 14 | 0.45 | 0.25 | ○ | 0.12 | ○ | 0.49 | 95.4 |
| No. 15 | 0.45 | 1.00 | ○ | 0.11 | ○ | 0.45 | 95.4 |
| No. 16 | 0.15 | 1.10 | ○ | 0.04 | ○ | 0.64 | 96.4 |
| No. 17 | 0.20 | 1.10 | ○ | 0.06 | ○ | 0.72 | 96.3 |
| No. 18 | 0.45 | 1.10 | ○ | 0.12 | ○ | 0.63 | 95.4 |
| *No. 19 | 0.50 | 0.25 | ○ | 0.13 | ○ | 0.32 | 95.4 |
| *No. 20 | 0.50 | 1.00 | ○ | 0.14 | ○ | 0.59 | 95.3 |
| *No. 21 | 0.50 | 1.10 | ○ | 0.13 | ○ | 0.65 | 95.4 |
| *No. 22 | 0.10 | 0.20 | ○ | 0.03 | ○ | 0.25 | 95.3 |
| *No. 23 | 0.15 | 0.20 | ○ | 0.04 | ○ | 0.28 | 95.4 |
| No. 24 | 0.15 | 0.25 | ○ | 0.06 | ○ | 0.33 | 96.0 |
| No. 25 | 0.20 | 0.48 | ○ | 0.08 | ○ | 0.41 | 96.3 |
| No. 26 | 0.45 | 1.00 | ○ | 0.11 | ○ | 0.58 | 95.4 |
| No. 27 | 0.45 | 1.10 | ○ | 0.12 | ○ | 0.66 | 95.3 |
| *No. 28 | 0.50 | 1.10 | ○ | 0.14 | ○ | 0.68 | 95.3 |

TABLE 1-2

Table 1-2

| Sample | Composition (mass % in terms of oxide) | | | | | | | | | | | | Total sintering aid amount |
|---|---|---|---|---|---|---|---|---|---|---|---|---|---|
| | $Al_2O_3$ | $SiO_2$ | MgO | BaO | CaO | SrO | $La_2O_3$ | $Nd_2O_3$ | $Pr_6O_{11}$ | $Y_2O_3$ | $Yb_2O_3$ | $B_2O_3$ | |
| *No. 29 | 93.61 | 4.79 | 0.15 | 0.53 | 0.28 | | | | 0.64 | | | | 6.39 |
| No. 30 | 93.61 | 4.53 | 0.14 | 0.50 | 0.26 | | | | 0.96 | | | | 6.39 |
| No. 31 | 93.61 | 4.35 | 0.17 | 0.60 | 0.31 | | | | 0.96 | | | | 6.39 |
| No. 32 | 93.61 | 3.45 | 0.26 | 0.92 | 0.48 | | | | 1.28 | | | | 6.39 |
| No. 33 | 93.61 | 1.76 | 0.28 | 0.97 | 0.51 | | | | 2.88 | | | | 6.39 |
| No. 34 | 93.61 | 1.67 | 0.29 | 1.02 | 0.53 | | | | 2.88 | | | | 6.39 |
| *No. 35 | 93.61 | 1.52 | 0.26 | 0.92 | 0.48 | | | | 3.20 | | | | 6.39 |
| *No. 36 | 93.61 | 4.79 | 0.15 | 0.53 | 0.28 | | | | | 0.64 | | | 6.39 |
| *No. 37 | 93.61 | 4.53 | 0.14 | 0.50 | 0.26 | | | | | 0.96 | | | 6.39 |
| No. 38 | 93.61 | 4.35 | 0.17 | 0.60 | 0.31 | | | | | 0.96 | | | 6.39 |
| No. 39 | 93.61 | 3.45 | 0.26 | 0.92 | 0.48 | | | | | 1.28 | | | 6.39 |
| No. 40 | 93.61 | 1.76 | 0.28 | 0.97 | 0.51 | | | | | 2.88 | | | 6.39 |
| No. 41 | 93.61 | 1.67 | 0.29 | 1.02 | 0.53 | | | | | 2.88 | | | 6.39 |
| *No. 42 | 93.61 | 1.52 | 0.26 | 0.92 | 0.48 | | | | | 3.20 | | | 6.39 |
| *No. 43 | 93.61 | 4.79 | 0.15 | 0.53 | 0.28 | | | | | | 0.64 | | 6.39 |
| *No. 44 | 93.61 | 4.53 | 0.14 | 0.50 | 0.26 | | | | | | 0.96 | | 6.39 |
| No. 45 | 93.61 | 4.35 | 0.17 | 0.60 | 0.31 | | | | | | 0.96 | | 6.39 |
| No. 46 | 93.61 | 3.45 | 0.26 | 0.92 | 0.48 | | | | | | 1.28 | | 6.39 |
| No. 47 | 93.61 | 1.76 | 0.28 | 0.97 | 0.51 | | | | | | 2.88 | | 6.39 |
| No. 48 | 93.61 | 1.67 | 0.29 | 1.02 | 0.53 | | | | | | 2.88 | | 6.39 |
| *No. 49 | 93.61 | 1.52 | 0.26 | 0.92 | 0.48 | | | | | | 3.20 | | 6.39 |
| No. 50 | 93.61 | 3.45 | 0.26 | | 1.40 | | 1.28 | | | | | | 6.39 |
| No. 51 | 93.61 | 3.45 | 0.74 | 0.92 | | | 1.28 | | | | | | 6.39 |
| No. 52 | 93.61 | 3.45 | | 0.92 | 0.74 | | 1.28 | | | | | | 6.39 |
| No. 53 | 93.61 | 3.45 | | 0.92 | | 0.74 | 1.28 | | | | | | 6.39 |
| No. 54 | 93.61 | 3.45 | 0.26 | | 0.48 | 0.92 | 1.28 | | | | | | 6.39 |
| No. 55 | 93.61 | 3.45 | 0.26 | 0.92 | 0.24 | 0.24 | 1.28 | | | | | | 6.39 |

| Sample | Mass ratio $R_{RE}$ | Mass ratio $R_2$ | Aluminate crystal phase | | $2ASiO_3$ crystal phase | | Relative density (%) |
|---|---|---|---|---|---|---|---|
| | | | Existence | Intensity ratio | Existence | Intensity ratio | |
| *No. 29 | 0.10 | 0.20 | ○ | 0.03 | ○ | 0.28 | 95.3 |
| No. 30 | 0.15 | 0.20 | ○ | 0.04 | ○ | 0.24 | 95.4 |
| No. 31 | 0.15 | 0.25 | ○ | 0.06 | ○ | 0.32 | 96.0 |
| No. 32 | 0.20 | 0.48 | ○ | 0.08 | ○ | 0.45 | 96.3 |
| No. 33 | 0.45 | 1.00 | ○ | 0.11 | ○ | 0.57 | 95.4 |
| No. 34 | 0.45 | 1.10 | ○ | 0.12 | ○ | 0.64 | 95.3 |
| *No. 35 | 0.50 | 0.10 | ○ | 0.14 | ○ | 0.63 | 95.3 |
| *No. 36 | 0.10 | 0.20 | ○ | 0.03 | ○ | 0.28 | 95.3 |
| *No. 37 | 0.15 | 0.20 | ○ | 0.04 | ○ | 0.24 | 95.4 |
| No. 38 | 0.15 | 0.25 | ○ | 0.06 | ○ | 0.32 | 96.0 |
| No. 39 | 0.20 | 0.48 | ○ | 0.08 | ○ | 0.45 | 96.3 |
| No. 40 | 0.45 | 1.00 | ○ | 0.11 | ○ | 0.57 | 95.4 |
| No. 41 | 0.45 | 1.10 | ○ | 0.12 | ○ | 0.64 | 95.3 |
| *No. 42 | 0.50 | 1.10 | ○ | 0.14 | ○ | 0.63 | 95.3 |
| *No. 43 | 0.10 | 0.20 | ○ | 0.03 | ○ | 0.28 | 95.3 |
| *No. 44 | 0.15 | 0.20 | ○ | 0.04 | ○ | 0.24 | 95.4 |
| No. 45 | 0.15 | 0.25 | ○ | 0.06 | ○ | 0.32 | 96.0 |
| No. 46 | 0.20 | 0.48 | ○ | 0.08 | ○ | 0.45 | 96.3 |
| No. 47 | 0.45 | 1.00 | ○ | 0.11 | ○ | 0.57 | 95.4 |
| No. 48 | 0.45 | 1.10 | ○ | 0.12 | ○ | 0.64 | 95.3 |
| *No. 49 | 0.50 | 1.10 | ○ | 0.14 | ○ | 0.63 | 95.3 |
| No. 50 | 0.20 | 0.48 | ○ | 0.08 | ○ | 0.46 | 95.9 |
| No. 51 | 0.20 | 0.48 | ○ | 0.07 | ○ | 0.48 | 95.8 |
| No. 52 | 0.20 | 0.48 | ○ | 0.08 | ○ | 0.45 | 95.9 |
| No. 53 | 0.20 | 0.48 | ○ | 0.08 | ○ | 0.47 | 95.8 |
| No. 54 | 0.20 | 0.48 | ○ | 0.06 | ○ | 0.46 | 96.2 |
| No. 55 | 0.20 | 0.48 | ○ | 0.08 | ○ | 0.45 | 96.2 |

(Leakage Current Evaluation Test 1)

Spark plugs 1 of FIGS. 1 and 2 were manufactured using the alumina-based sintered bodies of Sample Nos. 1 to 49. In each of the spark plugs 1, the nominal diameter of the thread portion 9 was M14; all of the conditions (1) to (5) were satisfied; the ratio (W/T) was in the range of 1 to 8; the protrusion amount Li of the insulator 3 was in the above-mentioned range; and the center electrode 2 had an inner electrode member 8 as a core formed predominantly of copper and extending to a front side of the imaginary plane.

Figure 3:
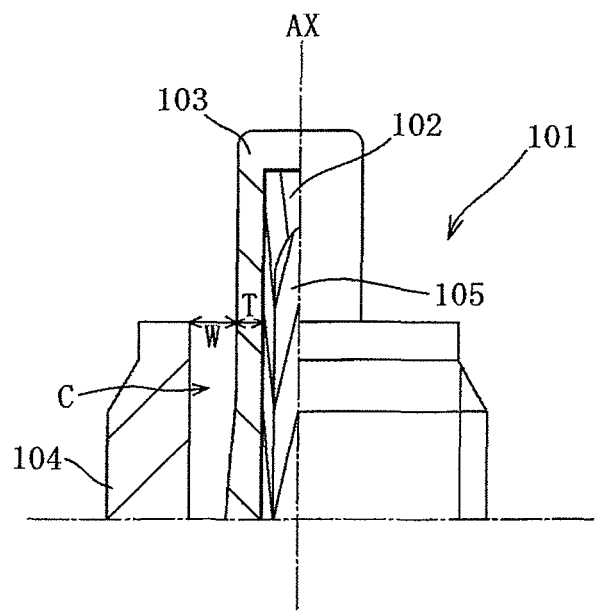
FIG. 3 is an enlarged view, partially in section, of an evaluation test plug used in leakage current evaluation test of experiment.

On the other hand, spark plugs 101 of FIG. 3 were manufactured as spark plug samples for leakage current evaluation test (hereinafter also referred to as "evaluation test plugs") basically in the same manner as the spark plugs 1. These evaluation test plugs 101 had insulators 103 formed of the alumina-based sintered bodies of Sample Nos. 1 to 49. The wall thickness T of the insulator 103 was herein controlled as indicated in Table 2. In each of the evaluation test plugs 101, the nominal diameter of the thread portion 9 was standardized to M14 so as to control the wall thickness T to be 1.5 mm or less. The outer diameter of the leg portion 3*e* of the insulator 103 and the opening diameter of the front end portion of the metal shell 104 were varied so as to set the same test conditions regardless of the wall thickness T. As shown in FIG. 3, no ground electrode was provided to the evaluation test plug 101 so that the center electrode 102 would not generate a spark discharge; and the center electrode 102 including the front end portion thereof was totally covered with, i.e., buried in the insulator 103. The above-configured evaluation test plugs 101 were basically the same as the above-manufactured spark plugs 1 except that the ratio (W/T) was 1.5. As mentioned above, the leakage current evaluation test 1 was performed under the same test conditions. Any of the evaluation test plug 101 was not downsized even when the wall thickness T was set to a value at which downsizing of the evaluation test plug 101 was possible. The nominal diameter of the thread portion 9 was standardized to M14 in each of the evaluation test plugs 101. The possibility of downsizing of the spark plug is irrelevant to the fact that the nominal diameter of the thread portion 9 was set to M14 in the leakage current evaluation test 1.

There was further provided an evaluation test engine (1.3-liter 4-cylinder engine, plug hole diameter: M14). Two plug samples, that is, the spark plug 1 and the evaluation test plug 101 were mounted to one cylinder of the evaluation test engine. In this state, a voltage was placed between the metal shell 104 and the core 105, that is, the inner electrode member of the center electrode 102 of the evaluation test plug 101 so as to apply a voltage of 28 kV to the core 105 of the evaluation test plug 101. A voltage was also placed between the metal shell 4 and the center electrode 2 of the spark plug 1 in the same manner as above. The application of the voltage was herein conducted at 60 Hz using a spark discharge power source for the spark plug 1.

Subsequently, the evaluation test engine was initiated upon ignition of fuel by the spark plug 1. While maintaining the rotation speed of the engine at 6600 rpm, the boost pressure and ignition timing of the evaluation test engine were adjusted in such a manner that the temperature of the insulator 103 facing the metal shell 104 of the evaluation test plug 101 was controlled to a target temperature (more specifically, 700° C.). The conditions for adjustment of the boost pressure and ignition timing were determined in advance using a temperature-check plug with a thermocouple. The adjustment of the boost pressure and the ignition timing was conducted by the adoption of such conditions.

In this state, the evaluation test engine was operated. During the operation of the engine, the voltage exerted on the evaluation test plug 101 was measured 500 times to judge whether the measured voltage was lowered from the applied voltage of 28 kV or not. It was judged that a leakage current occurred when the measured voltage was 1 kV or more lower than the applied voltage of 28 kV and, at the same time, when a penetrating discharge indicating a breakdown waveform of an ordinary spark discharge was not detected by an oscilloscope.

The above test was carried out on 3 samples for each evaluation test plug 101. The evaluation test plug 101 was evaluated in terms of the arithmetic mean number of times the measured voltage was 1 kV or more lower than the applied voltage of 28 kV. The evaluation criteria were as follows: "◎" when the number of times the measured voltage was 1 kV or more lower than the applied voltage of 28 kV was less than or equal to 1%; "○" when the number of times the measured voltage was 1 kV or more lower than the applied voltage of 28 kV was more than 1% and was less than or equal to 10%; and "×" when the number of times the measured voltage was 1 kV or more lower than the applied voltage of 28 kV was more than 10%. The evaluation results are indicated in Table 2.

TABLE 2

| T (mm) | Sample No. 1 | Sample No. 2 | Sample No. 3 | Sample No. 4 | Sample No. 5 | Sample No. 6 | Sample No. 7 | Sample No. 8 | Sample No. 9 | Sample No. 10 |
|---|---|---|---|---|---|---|---|---|---|---|
| 0.2 | X | X | X | X | X | X | X | X | X | X |
| 0.3 | X | X | X | X | X | X | X | X | ○ | ○ |
| 0.5 | X | X | X | X | X | X | X | X | ○ | ○ |
| 0.7 | X | X | X | X | X | X | X | X | ○ | ○ |
| 1.1 | X | X | X | X | X | X | X | X | ○ | ○ |
| 1.5 | ◎ | ◎ | X | X | X | X | ◎ | ◎ | ◎ | ◎ |

| T (mm) | Sample No. 11 | Sample No. 12 | Sample No. 13 | Sample No. 14 | Sample No. 15 | Sample No. 16 | Sample No. 17 | Sample No. 18 | Sample No. 19 | Sample No. 20 |
|---|---|---|---|---|---|---|---|---|---|---|
| 0.2 | X | X | X | X | X | X | X | X | X | X |
| 0.3 | ○ | ○ | ○ | ○ | ○ | ○ | ○ | ○ | X | X |
| 0.5 | ◎ | ◎ | ◎ | ◎ | ◎ | ○ | ◎ | ◎ | X | X |
| 0.7 | ◎ | ◎ | ◎ | ◎ | ◎ | ○ | ◎ | ◎ | X | X |
| 1.1 | ◎ | ◎ | ◎ | ◎ | ◎ | ○ | ◎ | ◎ | X | X |
| 1.5 | ◎ | ◎ | ◎ | ◎ | ◎ | ◎ | ◎ | ◎ | X | X |

| T (mm) | Sample No. 21 | Sample No. 21 | Sample No. 23 | Sample No. 24 | Sample No. 25 | Sample No. 26 | Sample No. 27 | Sample No. 28 | Sample No. 29 | Sample No. 30 |
|---|---|---|---|---|---|---|---|---|---|---|
| 0.2 | X | X | X | X | X | X | X | X | X | X |
| 0.3 | X | X | X | ○ | ○ | ○ | ○ | X | X | X |
| 0.5 | X | X | X | ○ | ◎ | ◎ | ◎ | X | X | X |
| 0.7 | X | X | X | ○ | ◎ | ◎ | ◎ | X | X | X |
| 1.1 | X | X | X | ○ | ◎ | ◎ | ◎ | X | X | X |
| 1.5 | X | X | X | ◎ | ◎ | ◎ | ◎ | X | X | X |

TABLE 2-continued

Table 2

| T (mm) | Sample No. 31 | Sample No. 32 | Sample No. 33 | Sample No. 34 | Sample No. 35 | Sample No. 36 | Sample No. 37 | Sample No. 38 | Sample No. 39 | Sample No. 40 |
|---|---|---|---|---|---|---|---|---|---|---|
| 0.2 | X | X | X | X | X | X | X | X | X | X |
| 0.3 | ○ | ○ | ○ | ○ | X | X | X | ○ | ○ | ○ |
| 0.5 | ○ | ◉ | ◉ | ◉ | X | X | X | ○ | ◉ | ◉ |
| 0.7 | ○ | ◉ | ◉ | ◉ | X | X | X | ○ | ◉ | ◉ |
| 1.1 | ○ | ◉ | ◉ | ◉ | X | X | X | ○ | ◉ | ◉ |
| 1.5 | ◉ | ◉ | ◉ | ◉ | X | X | X | ◉ | ◉ | ◉ |

| T (mm) | Sample No. 41 | Sample No. 42 | Sample No. 43 | Sample No. 44 | Sample No. 45 | Sample No. 46 | Sample No. 47 | Sample No. 48 | Sample No. 49 |
|---|---|---|---|---|---|---|---|---|---|
| 0.2 | X | X | X | X | X | X | X | X | X |
| 0.3 | ○ | X | X | X | ○ | ○ | ○ | ○ | X |
| 0.5 | ◉ | X | X | X | ○ | ◉ | ◉ | ◉ | X |
| 0.7 | ◉ | X | X | X | ○ | ◉ | ◉ | ◉ | X |
| 1.1 | ◉ | X | X | X | ○ | ◉ | ◉ | ◉ | X |
| 1.5 | ◉ | X | X | X | ◉ | ◉ | ◉ | ◉ | X |

As shown in Table 2, the leakage current evaluation results of the evaluation test plugs 101 in which all of the conditions (1) to (5) were satisfied were "○" or better. It was possible to prevent leakage current in these evaluation test plugs 101. In particular, the evaluation test plugs 101 whose mass ratio $R_{RE}$ was 0.2 to 0.45 was evaluated as "○" or "◉" even though the wall thickness T was decreased to 0.3 to 1.1 mm. It was thus possible to effectively prevent leakage current in each of these evaluation test plugs 101. It has been shown by these results that the spark plug is able to prevent leakage current effectively and attain good combustible-gas ignitability by satisfaction of all of the conditions (1) to (5) even in the case where the spark plug is downsized.

The leakage current evaluation results of the evaluation test plugs 101 in which at least any one of the conditions (1) to (5) was not satisfied were "X". It was not possible to prevent leakage current in these evaluation test plugs 101.

(Leakage Current Evaluation Test 2)

Insulators 103 for evaluation test plugs 101 were produced, each of which had a specific front end region formed of the alumina-based sintered body of Sample No. 12. More specifically, in one type of insulator 103, the region extending from the front end of the insulator 103 to the imaginary plane (0 mm) was formed of the alumina-based sintered body of Sample No. 12. In the other types of insulators 103, the region extending from the front end of the insulator 103 to 1 mm, 2 mm or 3 mm rear from the imaginary plane was formed of the alumina-based sintered body of Sample No. 12. Each of the insulators 103 was produced, basically in the same manner as the insulator 3, using a predetermined amount of raw material powder for formation of the alumina-based sintered body of Sample No. 12 and raw material powder not satisfying the composition of the alumina-based sintered body.

Using these insulators 103, evaluation test plugs 101 (wall thickness T: 0.5 mm) were manufactured basically in the same manner as in the leakage current evaluation test 1. Each of the evaluation test plugs 101 was tested for the occurrence of leakage current basically in the same manner as in the leakage current evaluation test 1. The leakage current evaluation results of the evaluation test plugs 101 in which the region of the insulator 103 from the front end to 2 mm or 3 mm rear from the imaginary plane was formed of the alumina-based sintered body of Sample No. 12 were "◉". It was possible to prevent leakage current in these evaluation test plugs. On the other hand, the leakage current evaluation results of the evaluation test plugs 101 in which the region of the insulator 103 from the front end to the imaginary plane (0 mm) or to 1 mm rear from the imaginary plane was formed of the alumina-based sintered body of Sample No. 12 were "X". It was not possible to prevent leakage current in these evaluation test plugs.

(Leakage Current Evaluation Test 3)

Evaluation test plugs 101 having insulators 103 being formed of the alumina-based sintered bodies of Sample Nos. 1 to 3 and 7 to 18 were manufactured basically in the same manner as in the leakage current evaluation test 1. Each of these evaluation test plugs 101 was tested for the occurrence of leakage current basically in the same manner as in the leakage current evaluation test 1 except that the boost pressure and ignition timing of the evaluation test engine were adjusted in such a manner that the temperature of the insulator 103 facing the metal shell 104 of the evaluation test plug 101 was controlled to 800° C. The evaluation results are indicated in Table 3.

TABLE 3

Table 3

| T (mm) | Sample No. | | | | | | | | | | | | | | |
|---|---|---|---|---|---|---|---|---|---|---|---|---|---|---|---|
| | 1 | 2 | 3 | 7 | 8 | 9 | 10 | 11 | 12 | 13 | 14 | 15 | 16 | 17 | 18 |
| 0.2 | X | X | X | X | X | X | X | X | X | X | X | X | X | X | X |
| 0.3 | X | X | X | X | X | X | X | ○ | ○ | ○ | ○ | ○ | X | X | X |
| 0.5 | X | X | X | X | X | X | X | ◉ | ◉ | ◉ | ◉ | ◉ | X | X | X |
| 0.7 | X | X | X | X | X | X | X | ◉ | ◉ | ◉ | ◉ | ◉ | X | X | X |
| 1.1 | X | X | X | X | X | X | X | ◉ | ◉ | ◉ | ◉ | ◉ | X | X | X |
| 1.5 | ◉ | ◉ | X | ◉ | ◉ | ◉ | ◉ | ◉ | ◉ | ◉ | ◉ | ◉ | ◉ | ◉ | ◉ |

As is clear from Table 3, it was possible in each of the evaluation test plugs 101 in which the insulators 103 were formed of the alumina-based sintered bodies of Sample Nos. 11 to 15, respectively, to prevent leakage current effectively under such a condition that the insulator 103 was heated to a high temperature of 800° C. even when the wall thickness T of the insulator 103 was reduced to 0.3 to 1.1 mm. It was possible to prevent leakage current particularly effectively when the wall thickness T of the insulator 103 was reduced to 0.5 mm. It has been shown by these results that, when all of the conditions (1) to (5) are satisfied, in particular, when the mass ratios $R_{RE}$ and $R_2$ are in the above-mentioned preferable ranges according to the conditions (3) and (4), the spark plug is able to prevent leakage current effectively and attain good combustible-gas ignitability even in the case where the spark plug is downsized and subjected to a high temperature of 800° C.

(Leakage Current Evaluation Test 4)

Basically in the same manner as in the leakage current evaluation test 1, insulators 103 were produced using the alumina-based sintered bodies of Sample No. 11 (wall thickness T=0.7 mm), Sample No. 12 (wall thickness T =0.3 mm and 0.7 mm) and Sample No. 15 (wall thickness T =0.7 mm). Evaluation test plugs 101 were manufactured using the above-produced insulators 103 in combination with metal shells 104 of appropriately adjusted front end opening diameters. In these evaluation test plugs 101, the ratio (W/T) was set as indicated in Table 4. Each of the evaluation test plugs 101 was tested basically in the same manner as in the leakage current evaluation test 3 to measure the voltage exerted on the evaluation test plug 101 during operation of the evaluation test engine. The evaluation test plug 101 was subjected to successive discharge operations until the number of times the measured voltage was 1 kV or more lower than the applied voltage reached 50, thereby determining a voltage drop between the applied voltage of 28 kV and the measured voltage at the time the number of times the measured voltage was 1 kV or more lower than the applied voltage reached 50. The evaluation results are indicated in Table 4.

TABLE 4

Table 4

| Sample No. 11 T = 0.7 | | Sample No. 12 T = 0.3 | | Sample No. 12 T = 0.7 | | Sample No. 15 T = 0.7 | |
|---|---|---|---|---|---|---|---|
| W/T | Voltage drop (KV) | W/T | Voltage drop (KV) | W/T | Voltage drop (KV) | W/T | Voltage drop (KV) |
| 0.43 | 8.8 | 0.33 | 11.2 | 0.43 | 8.5 | 0.43 | 9.0 |
| 0.57 | 8.0 | 0.67 | 10.6 | 0.57 | 7.8 | 0.57 | 8.3 |
| 0.71 | 7.7 | 0.83 | 10.4 | 0.71 | 7.6 | 0.71 | 7.9 |
| 1.00 | 4.7 | 1.00 | 6.0 | 1.00 | 4.5 | 1.00 | 5.0 |
| 1.43 | 4.0 | 1.67 | 5.4 | 1.43 | 4.0 | 1.43 | 4.5 |
| 2.14 | 4.1 | 2.33 | 5.0 | 2.14 | 3.9 | 2.14 | 4.3 |
| 2.86 | 4.0 | 3.00 | 5.1 | 2.86 | 3.8 | 2.86 | 4.0 |
| 3.57 | 3.9 | 4.00 | 5.2 | 3.57 | 3.8 | 3.57 | 4.1 |

As shown in Table 4, the voltage drop was 6 kV or smaller so that it was possible to prevent leakage current even in the evaluation test plugs 101 in which the wall thickness T of the insulator 103 was reduced to 0.3 mm or 0.7 mm when the ratio (W/T) was greater than or equal to 1.

(Leakage Current Evaluation Test 5)

Evaluation test plugs 101 having insulators 103 formed of the alumina-based sintered bodies of Sample Nos. 1, 2, 8, 9, 12 and 15 were manufactured basically in the same manner as in the leakage current evaluation test 1. In these evaluation test plugs 101, the ratio (W/T) was set to 1.0; the wall thickness T of the insulator 103 was controlled as indicated in Table 5; and the dimensions of the metal shell 104 were controlled in such a manner that the nominal diameter of the thread portion 9 was set to M10. Each of the evaluation test plugs 101 was tested for the occurrence of leakage current basically in the same manner as in the leakage current evaluation test 1 except that the plug hole diameter of the evaluation test engine was M10. The evaluation results are indicated in Table 5.

TABLE 5

Table 5

| T (mm) | Sample No. | | | | | |
|---|---|---|---|---|---|---|
|  | 1 | 2 | 8 | 9 | 12 | 15 |
| 0.2 | X | X | X | X | X | X |
| 0.3 | X | X | X | ○ | ○ | ○ |
| 0.5 | X | X | X | ○ | ◎ | ◎ |
| 0.7 | X | X | X | ○ | ◎ | ◎ |
| 1.1 | X | X | X | ○ | ◎ | ◎ |

As shown in Table 5, the same results as those of the leakage current evaluation test 1 were obtained even in the downsized evaluation test plugs 101 in which the nominal diameter of the thread portion 9 was M10. It was possible to prevent leakage current when all of the conditions (1) to (5) were satisfied. It has been shown by these results that the spark plug is able to prevent leakage current by satisfaction of all of the conditions (1) to (5) even when the spark plug is downsized so that it is difficult to secure the sufficient wall thickness of the insulator. The present invention is thus effective for the downsized spark plug.

(Leakage Current Evaluation Test 6)

Figure 4:
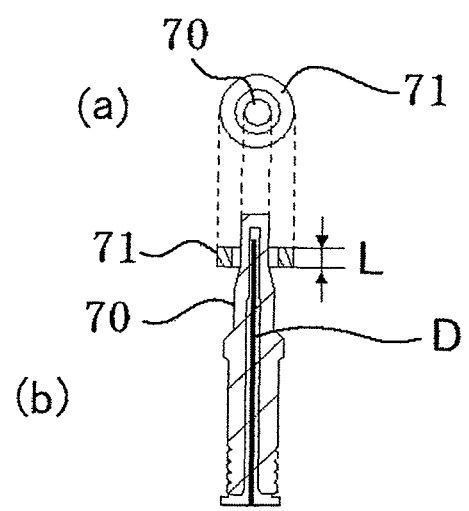
FIG. 4 is a schematic view of an instrument for leakage current evaluation test 6 of experiment.

Test insulators 70 of FIG. 4, 5 samples for each type, were produced basically in the same manner as in the leakage current evaluation test 1 using the alumina-based sintered bodies of Sample Nos. 12 and 50 to 55. Herein, each of the test insulators 70 had an axial hole formed in the center thereof along the axis direction, with a front end of the axial hole being closed, as shown in FIG. 4. A center electrode D was inserted and placed in the axial hole of the test insulator 70. In this state, the test insulator 70 was tested for the temperature (° C.) of occurrence of leakage current. There was used an instrument for the leakage current evaluation test 6 as shown in FIG. 4. FIG. 4(a) is an overhead view of the test insulator 70 and a metal ring 71 surrounding a front end portion of the test insulator 70; and FIG. 4(b) is a cross section view of the test insulator 70 and the ring 71. The test insulator 70 was fixed in a stand-up state by fixing means (not shown), whereas the ring 71 was herein fixed by fixing means (not shown) to the front end portion of the test insulator 70 so as to serve as the metal shell of the spark plug, in particular, the front end portion of the metal shell. Thus, the axial length L of the ring 71 was set to 3 to 4 mm; and the inner diameter of the ring 71 was set in such a manner that, at a front end face of the ring 71 (top side in FIG. 4), the ratio (W'/T') of a separation distance W' between the test insulator 70 and the ring 71 to a wall thickness T' of the test insulator 70 as corresponding to the ratio (W/T) was 1.5. The ring 71 was located at a position where the wall thickness T' of the test insulator 70 at the front end face as corresponding to the wall thickness T was 0.7 mm. In this state, the ring 71 was subjected to radio-frequency heating so as to heat the test insulator 70 indirectly by heat radiation from the ring 71 while applying a voltage of 28 kV between the center electrode D and the ring 71 by CDI power source (60 Hz). The heating temperature of the ring 71 was gradually increased. The occurrence of leakage current in the test insulator 70 was checked in the same manner as in the leakage current evaluation test 1. The temperature (° C.) of the test insulator 70 surrounded by the ring 71 at the time the leakage current occurred was then measured with a radiation thermometer. Five samples of each type of the test insulator 70 were tested in the same manner to measure the temperature (° C.) of occurrence of leakage current. The arithmetic mean of the middle three measured temperature values was determined as the "leakage current temperature (° C.)" of the test insulator 70.

TABLE 6

Table 6

| | Sample No. | | | | | | |
|---|---|---|---|---|---|---|---|
| | 12 | 55 | 54 | 51 | 52 | 53 | 50 |
| Leakage current temperature (° C.) | 953 | 960 | 908 | 867 | 869 | 873 | 845 |

As shown in Table 6, the test insulators using the alumina-based sintered bodies of Sample Nos. 54 and 12 in which three kinds of Group 2 element components were contained and the alumina-based sintered body of Sample No. 55 in which four kinds of Group 2 element components were contained had a higher leakage current temperature than the test insulators using the alumina-based sintered bodies of Sample Nos. 50 to 53 in which two kinds of Group 2 element components were contained. In particular, the leakage current temperature of the test insulator using the alumina-based sintered body of Sample No. 12 in which Ba component was contained was higher than the leakage current temperature of the test insulator using the alumina-based sintered body of Sample No. 54 in which Ba component was not contained even though three kinds of Group 2 element components were contained in each of these alumina-based sintered bodies. The leakage current temperature of the test insulators using the alumina-based sintered bodies of Sample Nos. 51 to 53 in which Ba component was contained was also higher than the leakage current temperature of the test insulator using the alumina-based sintered body of Sample No. 50 in which Ba component was not contained even though two kinds of Group 2 element components were contained in each of these alumina-based sintered bodies. It has thus been shown that, in the case of using Ba component in combination with the Group 2 element component other than the Ba component, the most preferable combination is Ba and Sr components (Sample No. 53); the second preferable combination is Ba and Ca components (Sample No. 52); and the third preferable combination is Ba and Mg component (Sample No. 51) due to the fact that the likelihood of occurrence of migration of the Group 2 element component decreases in the order of Ba component>Sr component>Ca component>Mg component when the physical properties such as density and composition of the alumina-based sintered body are the same.

(Leakage Current Evaluation Test 7)

Nine kinds of raw material powders were each prepared by mixing an alumina powder, a Si compound powder, a Ca compound powder, a Mg compound powder and a Ba compound powder as a Group 2 element compound powder and a La component powder as a rare earth element compound powder. The compositions of these raw material powders were set to the same as that of Sample No. 17 as mentioned above in "Production of Alumina-Based Sintered Bodies".

Further, the particle size distribution ratio (90% volume diameter/10% volume diameter) of the raw material powder was controlled as indicated in Table 7. The average particle sizes of the alumina powder, the Si compound powder, the Group 2 element compound powder and the rare earth element compound powder were each in the above-mentioned range but were set to different values so as to control the particle size distribution ratio (90% volume diameter/10% volume diameter) as indicated in Table 7.

Each of the raw material powders was formed into a slurry by the addition of a hydrophilic binding agent such as polyvinyl alcohol and water as a solvent. The slurry was subjected to spray drying, thereby granulating the raw material powder to spherical particles having an average particle size of about 100 μm. The granulated raw material powder was molded into a green compact body as an insulator precursor by rubber press forming. The green compact body was sintered by firing in the air under the conditions of a firing temperature of 1450 to 1650° C. and a firing time of 1 to 8 hours. The sintered molded body was then finished by firing with a glaze. By the above procedure, nine kinds of alumina-based sintered bodies were produced. The firing conditions were set to the same within the above ranges.

The compositions of the respective alumina-based sintered bodies, that is, the amounts of the respective components contained in the respective alumina-based sintered bodies and the mass ratios $R_{RE}$ and $R_2$ of the respective alumina-based sintered bodies were determined in the same manner as mentioned above in "Production of Alumina-Based Sintered Bodies". The determination results were the same as those of Sample No. 17 in Table 1. The alumina-based sintered bodies were also each tested for the relative density in the same manner as mentioned above in "Production of Alumina-Based Sintered Bodies". The test results are indicated in Table 7.

Each of the alumina-based sintered bodies was tested for the existence of aluminate crystal phase in the same manner as mentioned above in "Production of Alumina-Based Sintered Bodies". The intensity ratio [aluminate/alumina] was also determined from the X-ray diffraction analysis chart according to the above-mentioned method. (intensity ratio [aluminate/alumina] is referred to as "aluminate crystal phase: intensity ratio" in Table 7) These results are indicated in Table7. In Table 7, the symbol "○" indicates the existence of the aluminate crystal phase; and the symbol "x" indicates the absence of the alumiate crystal phase.

Further, each of the alumina-based sintered bodies of Sample Nos. 1 to 55 was tested for the existence of silicate crystal phase in the same manner as in the determination of the existence of aluminate crystal phase. The intensity ratio [silicate/alumina] was also determined from the X-ray diffraction analysis chart according to the above-mentioned method. (The intensity ratio [silicate/alumina] is referred to as "$2ASiO_3$ crystal phase: intensity ratio" in Table 7.) These results are indicated in Table 7. In Table 7, the symbol "○" indicates the existence of the $2ASiO_3$ crystal phase; and the symbol "x" indicates the absence of the silicate crystal phase.

Using the above-produced nine kinds of alumina-based sintered bodies, spark plug 1 of FIS. 1 and 2, 50samples for each type, were manufactured. In each of these nine types of spark plugs 1, the nominal diameter of the thread portion 9 was M14; the wall thickness T was 0.3 mm; the ratio (W/T) of the separation distance W was set to the same within the range of 1 to 8; the protrusion amount Li of the insulator 3 was set to the same within the above-mentioned range; and the center electrode 2 had an inner electrode member 8 as a core formed predominantly of copper and extending to a front side of the imaginary plane.

On the other hand, spark plugs 101 of FIG. 3, 50 samples for each type, were manufactured as evaluation test samples basically in the same manner as the spark plugs 1. More specifically, different types of evaluation test plugs 101 corresponding to the respective types of spark plugs 1, 50 samples for each type, were manufactured basically in the same manner as the spark plugs 1 and as the evaluation test plugs 101 in the leakage current evaluation test 1, except that the insulator 103 of the evaluation test plug 101 had a wall thickness T of 0.3 mm, using the same raw material powders as those of the spark plugs 1.

On the basis of the kind of the raw material powder, there were provided 50 pairs of the spark plug 1 and the evaluation test plug 101, each pair including one of the 50 samples of the spark plug 1 and one of the 50 samples of the evaluation test plug 101. All of the 50 pairs of the spark plug and the evaluation test plug 101 on each kind of the raw material powder were tested for the occurrence of leakage current basically in the same manner (target temperature: 700° C.) as in the leakage current evaluation test 1. The occurrence of leakage was evaluated in terms of the rate of failures in the 50 plug pairs. The rate of failures was herein determined by the following procedure. Each pair of the spark plug and the evaluation test plug 101 was mounted onto an evaluation test engine. During operation of the evaluation test engine, a voltage of 28 kV was applied between the spark plug and the evaluation test plug 101. The voltage exerted on the evaluation test plug 101 was measured 500 times. The plug pair was judged as failed when the total number of times when the measured voltage was 1 kV or more lower than the applied voltage of 28 kV and when a penetrating discharge indicating a breakdown waveform of an ordinary spark discharge was detected by an oscilloscope was 10% or more out of the 500 measurement times. The rate of the failed plug pairs in the 50 plug pairs was calculated as the rate of failures. The evaluation criteria were as follows: "⊚" when the rate of failures (failed plug pairs/50 plug pairs) was lower than 5%; "○" when the rate of failures (failed plug pairs/50 plug pairs) was higher than or equal to 5% and lower than 10%; and "Δ" when the rate of failures (failed plug pairs/50 plug pairs) was higher than or equal to 10%.

ing and sintering the prepared raw material powder. This led to high-yield manufacturing of the spark plugs 1 and evaluation test samples 101 in each of which leakage current was unlikely to occur. It has thus been shown that, by the spark plug manufacturing method in which the insulator is produced by preparing the mixed raw material powder according to the condition (A) and sintering the prepared raw material powder, the spark plug can be manufactured with high yield so as to make leakage current unlikely to occur in the insulator and attain good combustible-gas ignitability.

Industrial Applicability

The spark plug according to the present invention and the spark plug manufactured by the manufacturing method of the spark plug according to the present invention can be used in any internal combustion engines. As the insulator 3 is formed of the alumina-based sintered body and is unlikely to incur leakage current, the spark plug is suitable for use in the recent completed internal combustion engine, high-output internal combustion engine or downsized internal combustion engine or in the internal combustion engine whose combustion chamber reaches a high temperature of 800° C. or higher.

DESCRIPTION OF REFERENCE NUMERALS

1: Spark plug
2: Center electrode
3: Insulator
3e: Leg portion
4: Metal shell
4a: Front end face
6: Ground electrode
7: Outer electrode member
8: Inner electrode member
9: Thread portion
70: Test insulator
71: Ring
101: Spark plug for leakage current evaluation test (Evaluation test plug)
102: Center electrode
103: Insulator
104: Metal shell
105: Core

TABLE 7

| Particle size distribution ratio | Aluminate crystal phase | | $2ASiO_3$ crystal phase | | Relative density | Voltage | Evaluation |
|---|---|---|---|---|---|---|---|
| (90% diameter/10% diameter) | Existence | Intensity ratio | Existence | Intensity ratio | (%) | (KV) | result |
| 2.8 | ○ | 0.04 | ○ | 0.32 | 95.7 | 28 | ○ |
| 3.2 | ○ | 0.04 | ○ | 0.33 | 95.8 | 28 | ○ |
| 3.6 | ○ | 0.06 | ○ | 0.56 | 96.3 | 28 | ⊚ |
| 4.4 | ○ | 0.07 | ○ | 0.61 | 96.3 | 28 | ⊚ |
| 5.0 | ○ | 0.08 | ○ | 0.58 | 96.2 | 28 | ⊚ |
| 5.2 | ○ | 0.08 | ○ | 0.61 | 96.2 | 28 | ⊚ |
| 5.7 | ○ | 0.07 | ○ | 0.72 | 95.4 | 28 | Δ |
| 6.1 | ○ | 0.08 | ○ | 0.65 | 95.0 | 28 | Δ |
| 6.3 | ○ | 0.07 | ○ | 0.60 | 94.8 | 28 | Δ |

As shown in Table 7, it was possible for the alumina-based sintered body to maintain high relative density and allow deposition of a large amount of aluminate crystal and silicate crystal with high repeatability in each of the spark plugs in which the insulator was produced by preparing the raw material powder at the particle size distribution ratio (90% volume diameter/10% volume diameter) of 3.6 to 5.2 and press-form-

The invention claimed is:

1. A spark plug, comprising:
   a center electrode extending in an axial direction of the spark plug;
   a substantially cylindrical insulator disposed around the center electrode and having a small-leg portion at a front end side thereof; and a substantially cylindrical metal shell disposed around the insulator, wherein the spark plug satisfies the following conditions (1) to (5):

condition (1): the insulator has a wall thickness T of 0.3 to 1.1 mm at an imaginary plane including a front end face of the metal shell;

condition (2): a region of the insulator extending from a front end of the insulator to at least 2 mm rear from the imaginary plane is formed of an alumina-based sintered body containing a Si component, a rare earth element component and components of at least two kinds of Group 2 elements of the periodic table according to IUPAC recommendations 1990 and being substantially free from a B component;

condition (3): the mass ratio $R_{RE}$ of a mass of the rare earth element component (in terms of oxide) to a total mass of the Si component, the components of the Group 2 elements and the rare earth element component (in terms of oxides) in the alumina-based sintered body is 0.15 to 0.45;

condition (4): the mass ratio $R_2$ of a total mass of the components of the Group 2 elements (in terms of oxides) to a mass of the Si component (in terms of oxide) in the alumina-based sintered body is 0.25 or greater; and condition (5): the alumina-based sintered body includes, in a grain boundary phase thereof, an aluminate crystal containing the rare earth element component.

2. The spark plug according to claim 1, wherein the wall thickness T is 0.5 to 1.1 mm; and wherein the mass ratio $R_{RE}$ is 0.2 to 0.45.

3. The spark plug according to claim 1, wherein, when an X-ray diffraction spectrum of the alumina-based sintered body is measured, the intensity ratio of a highest-intensity peak attributed to the aluminate crystal to a highest-intensity peak attributed to alumina in the X-ray diffraction spectrum is 0.04 or greater.

4. The spark plug according to claim 1, wherein the mass ratio $R_2$ is 0.25 to 1.0.

5. The spark plug according to claim 1, wherein the alumina-based sintered body includes, in the grain boundary phase thereof, a silicate crystal containing the components of the Group 2 elements; and wherein, when an X-ray diffraction spectrum of the alumina-based sintered body is measured, the intensity ratio of a highest-intensity peak attributed to the silicate crystal to the highest-intensity peak attributed to the aluminate crystal in the X-ray diffraction spectrum is 0.32 or greater.

6. The spark plug according to claim 1, further comprising a ground electrode joined to a front end of the metal shell, wherein the ratio W/T of a separation distance W between the insulator and the metal shell to the wall thickness T of the insulator at the imaginary plane is 1 to 8.

7. The spark plug according to claim 1, wherein the Group 2 elements are at least three kinds of Group 2 elements.

8. The spark plug according to claim 1, wherein the Group 2 elements include a Ba element.

9. The spark plug according to claim 1, wherein the metal shell has a thread portion formed on an outer circumferential surface thereof with a nominal diameter of M10 or smaller.

10. A manufacturing method of a spark plug, comprising: producing an insulator by preparing a raw material powder, press-forming the prepared raw material powder into a given body and sintering the press-formed body, wherein the raw material powder is prepared by mixing an Al compound powder, a Si compound powder, a powder of compounds of at least two kinds of Group 2 elements of the periodic table according to IUPAC recommendations 1990 and a rare earth element compound powder in such a manner as to satisfy the following condition (A):

condition (A): the particle size distribution ratio (90% volume diameter/10% volume diameter) between particles of 10% volume diameter and particles of 90% volume diameter in the raw material powder is 3.6 to 5.2.

\* \* \* \* \*